(12) United States Patent
Takeda et al.

(10) Patent No.: US 11,528,729 B2
(45) Date of Patent: *Dec. 13, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Yuki Matsumura, Tokyo (JP); Kazuaki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/346,270

(22) PCT Filed: Oct. 31, 2017

(86) PCT No.: PCT/JP2017/039286
§ 371 (c)(1),
(2) Date: Apr. 30, 2019

(87) PCT Pub. No.: WO2018/084137
PCT Pub. Date: May 11, 2018

(65) Prior Publication Data
US 2019/0261397 A1   Aug. 22, 2019

(30) Foreign Application Priority Data
Nov. 1, 2016   (JP) .............................. JP2016-214704

(51) Int. Cl.
*H04W 72/12*   (2009.01)
*H04L 27/26*   (2006.01)
(Continued)

(52) U.S. Cl.
CPC ......... *H04W 72/1268* (2013.01); *H04L 27/26* (2013.01); *H04W 28/06* (2013.01);
(Continued)

(58) Field of Classification Search
None
See application file for complete search history.

(56) References Cited

U.S. PATENT DOCUMENTS 11,139,938 B2 * 10/2021 Takeda .................. H04L 5/0053
2013/0100866 A1    4/2013 Yang et al.
(Continued)

OTHER PUBLICATIONS

International Search Report issued in PCT/JP2017/039286 dated Jan. 23, 2018 (2 pages).
(Continued)

*Primary Examiner* — Diane L Lo
(74) *Attorney, Agent, or Firm* — Osha Bergman Watanabe & Burton LLP

(57) ABSTRACT

To properly transmit uplink control information (UCI) in future radio communication systems, a user terminal of the present invention is provided with a transmitting section that transmits uplink control information (UCI) in at least one of a plurality of slots with different time lengths of UL duration, and a control section that controls transmission of the UCI, where based on an explicit instruction from a radio base station or an implicit determination by the user terminal, the control section controls an uplink (UL) control channel used in transmission of the UCI.

4 Claims, 19 Drawing Sheets

(51) Int. Cl.
  *H04W 28/06* (2009.01)
  *H04W 72/04* (2009.01)
  *H04L 5/00* (2006.01)

(52) U.S. Cl.
  CPC ....... *H04W 72/04* (2013.01); *H04W 72/0413* (2013.01); *H04W 72/0446* (2013.01); *H04W 72/12* (2013.01); *H04W 72/1289* (2013.01); *H04L 5/001* (2013.01)

(56) References Cited

U.S. PATENT DOCUMENTS

| | | | | |
|---|---|---|---|---|
| 2014/0098780 | A1* | 4/2014 | Kim | H04L 5/0055 370/329 |
| 2015/0365925 | A1* | 12/2015 | Fu | H04L 5/0048 370/329 |
| 2016/0249329 | A1* | 8/2016 | Au | H04W 72/0446 |
| 2017/0164350 | A1* | 6/2017 | Sun | H04L 5/0007 |
| 2018/0098349 | A1* | 4/2018 | Sun | H04W 72/042 |
| 2018/0103485 | A1* | 4/2018 | Jiang | H04L 1/1861 |
| 2018/0124815 | A1* | 5/2018 | Papasakellariou | H04L 1/1861 |
| 2018/0145796 | A1* | 5/2018 | Liang | H04L 1/1861 |
| 2018/0249458 | A1* | 8/2018 | He | H04L 1/1861 |
| 2019/0150007 | A1* | 5/2019 | Frenne | H04W 24/08 370/252 |
| 2019/0173622 | A1* | 6/2019 | Xiong | H04W 76/27 |

OTHER PUBLICATIONS

Written Opinion of the International Searching Authority issued in PCT/JP2017/039286 dated Jan. 23, 2018 (4 pages).
Nokia, Alcatel-Lucent Shanghai Bell; "On the UL control channel structure for NR"; 3GPP TSG-RAN WG1 #86 Bis, R1-1609740; Lisbon, Portugal; Oct. 10-14, 2016 (6 pages).
Qualcomm et al.; "WF on Waveform for NR Uplink"; 3GPP TSG RAN WG1 #86-Bis, R1-1610485; Lisbon, Portugal; Oct. 10-14, 2016 (6 pages).
Qualcomm Incorporated; "Scaled Numerology Control Design for NR"; 3GPP TSG-RAN WG1 #86, R1-166363; Gothenburg, Sweden; Aug. 22-26, 2016 (11 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Partial Supplementary European Search Report issued in Application No. 17866780.4, dated May 25, 2020 (14 pages).
3GPP TSG RAN WG1 #86bis; R1-1609129; "UL Control Channel Design;" Samsung; Oct. 10-14, 2016; Lisbon, Portugal (3 pages).
Extended European Search Report issued in European Application No. 17866780.4, dated Sep. 23, 2020 (10 pages).
Office Action in counterpart European Patent Application No. 17 866 780.4 dated Jun. 22, 2021 (7 pages).
Office Action issued in the counterpart European Patent Application No. 17866780.4, dated Sep. 30, 2021 (6 pages).
Office Action in counterpart European Patent Application No. 17 866 780.4 dated Apr. 29, 2022 (6 pages).
Office Action issued in Indian Application No. 201917018280; dated Dec. 3, 2021 (7 pages).
Office Action issued in Japanese Application No. 2018-549010; dated Nov. 30, 2021 (8 pages).
3GPP TSG RAN WG1 Meeting #86; R1-166105 "Discussion on timing relations for NR frame structure" Huawei, HiSilicon; Gothenburg, Sweden; Aug. 22-26, 2016 (4 pages).
Office Action issued in European Application No. 17866780.4; dated Sep. 21, 2022 (8 pages).

* cited by examiner

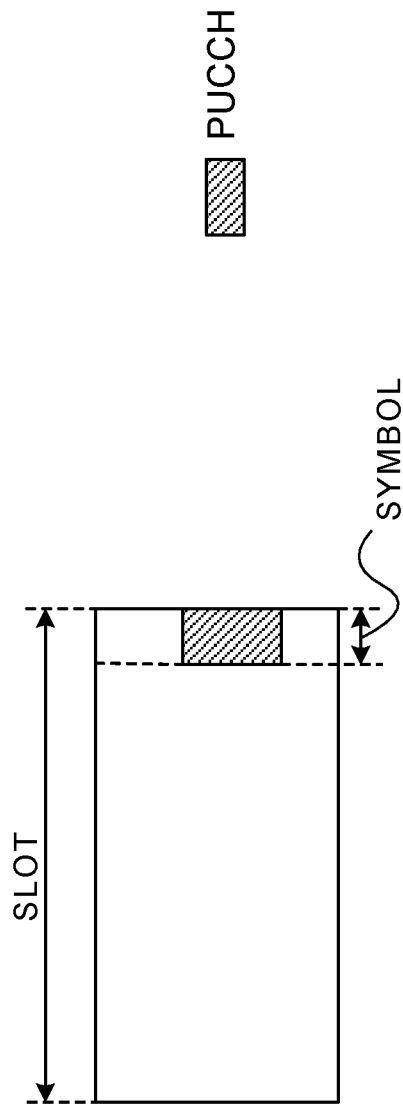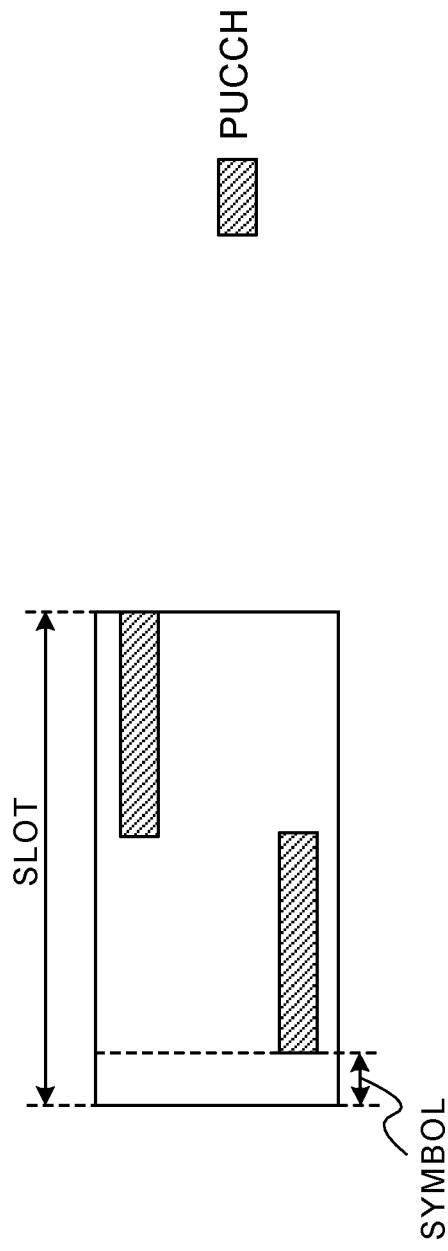
FIG. 2A
FIG. 2B

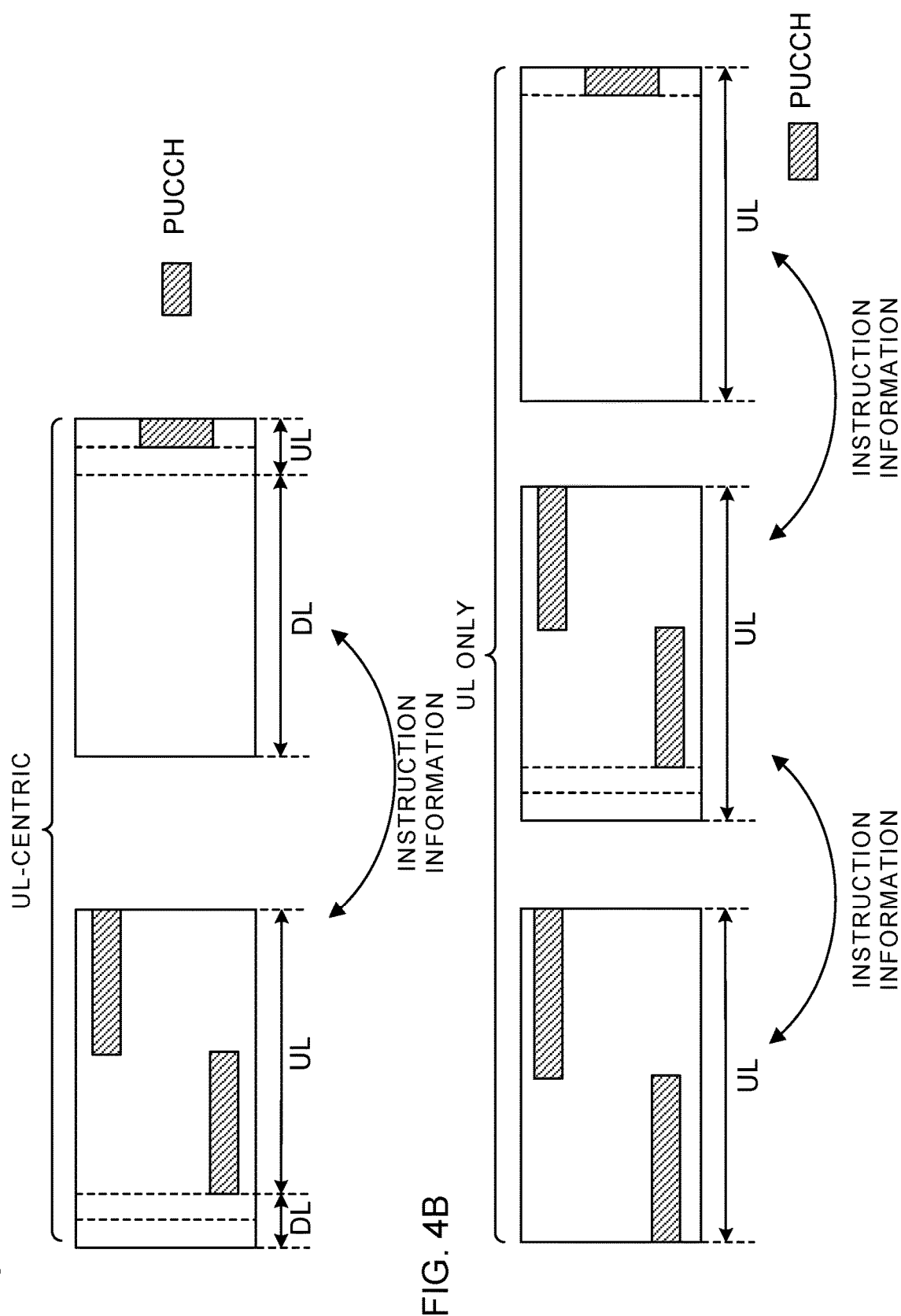

HARQ-ACK TO DL DATA CHANNEL WITH THE
NUMBER OF TRANSMISSION TIMES LESS THAN N

HARQ-ACK TO DL DATA CHANNEL WITH THE
NUMBER OF TRANSMISSION TIMES of N OR MORE

FIG. 7A

| TIME LENGTH OF PUCCH | PUCCH WAVEFORM |
|---|---|
| SHORT DURATION | OFDM |
| LONG DURATION | DFT-s-OFDM |

FIG. 7B

| THE NUMBER OF SYMBOLS | PUCCH WAVEFORM |
|---|---|
| LESS THAN N | OFDM |
| N OR MORE | DFT-s-OFDM |

FIG. 7C

| INSTRUCTION INFORMATION | PUCCH WAVEFORM |
|---|---|
| 1 | OFDM |
| 0 | DFT-s-OFDM |

FIG. 7D

| PUSCH WAVEFORM | PUCCH WAVEFORM |
|---|---|
| OFDM | OFDM |
| DFT-s-OFDM | DFT-s-OFDM |

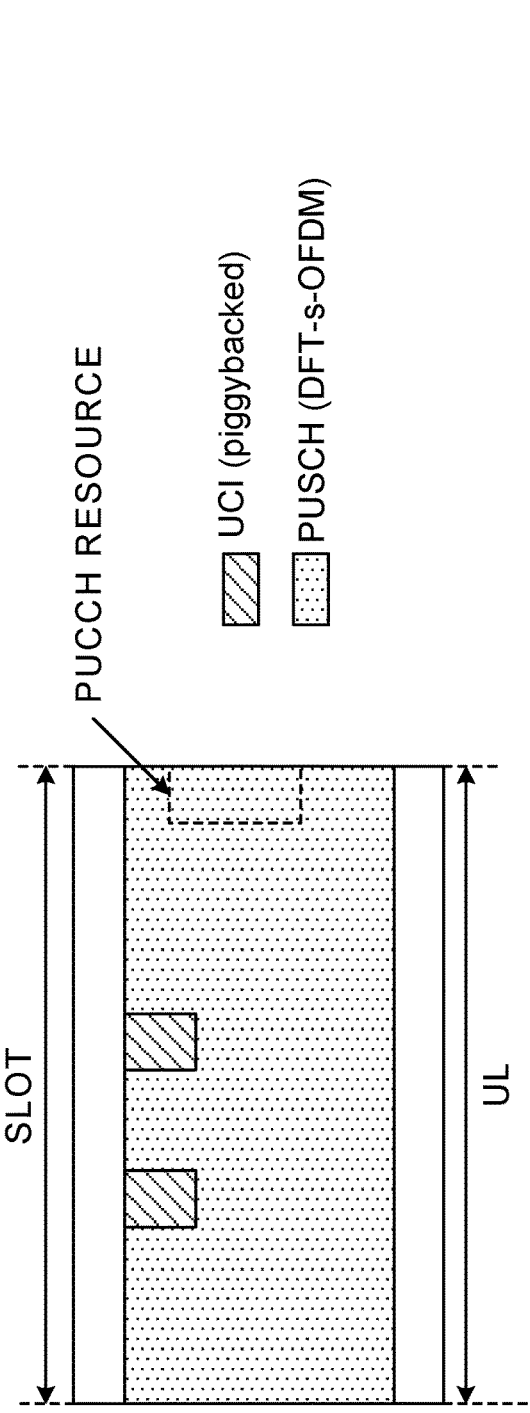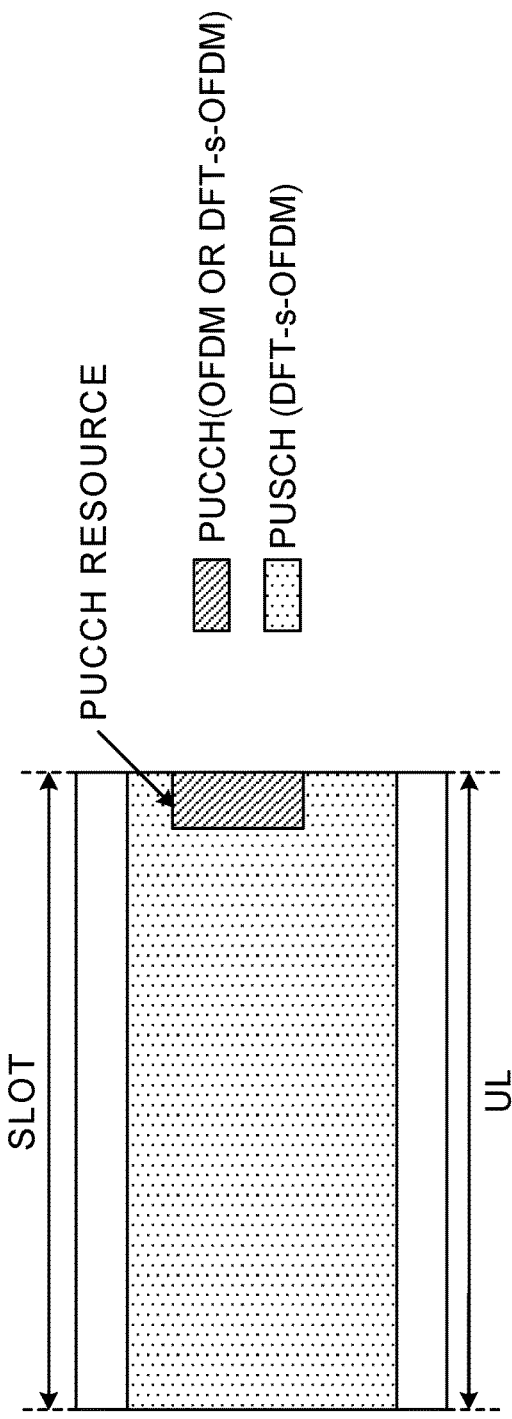

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE, successor systems (e.g., also referred to as LTE-A (LTE-Advanced), FRA (Future Radio Access), 4G, 5G, 5G+ (plus), NR (New RAT), LTE Rel. 14, 15~, etc.) to LTE have also been studied.

In the existing LTE system (e.g., LTE Rel.10 onward), in order to widen the band, introduced is Carrier Aggregation (CA) for aggregating a plurality of carriers (Component Carrier: CC, cell). Each carrier is configured with a system band of LTE Rel.8 as one unit. Further, in CA, a plurality of CCs of the same radio base station (eNB: eNodeB)) is configured for a user terminal (UE: User Equipment).

Further, in the existing LTE system (e.g., LTE Rel.12 onward), Dual Connectivity (DC) is also introduced where a plurality of cell groups (CG: Cell Group) of different radio base stations is configured for a user terminal. Each cell group is comprised of at least a single carrier (CC, cell). Since a plurality of carriers of different radio base stations is aggregated, DC is also called inter-base station CA (Inter-eNB CA) and the like.

Furthermore, in the existing LTE system (e.g., LTE Rel.8-13), using a transmission time interval (TTI) (also referred to as subframe) of 1 ms, communication is performed on downlink (DL) and/or uplink (UL). The TTI of 1 ms is a transmission time unit of one data packet subjected to channel coding, and is a processing unit of scheduling, link adaptation, retransmission control (HARQ: Hybrid Automatic Repeat reQuest) and the like.

Still furthermore, in the existing LTE system (e.g., LTE Rel.8-13), a user terminal transmits uplink control information (UCI), for example, using a UL control channel (e.g., PUCCH: Physical Uplink Control Channel) or a UL data channel (e.g., PUSCH: Physical Uplink Shared Channel). The UCI includes at least one of a scheduling request (RS), retransmission control information (HARQ-ACK (Acknowledge), ACK or NACK (Negative ACk)) to DL data, and channel state information (CSI).

CITATION LIST

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (e.g., 5G, NR, etc.), it is required that a single framework accommodates various services including high speed, high capacity or high throughput communication such as eMBB (enhanced Mobile Broad Band), massive connection (mMTC: massive MTC) from devices (user terminals) for machine-to-machine (M2M) communication such as IoT (Internet of Things) and MTC (Machine Type Communication), low delay and high reliability communication such as URLLC (Ultra-reliable and low latency communication) and the like. In URLLC, higher delay reduction effects are required than eMBB and mMTC.

Thus, in future radio communication systems expected to accommodate a plurality of services with different requirements, it is expected to use a plurality of slots, where a time length of duration (UL duration) for UL communication differs in slots, (e.g., slot (UL only slot) where UL communication is performed in all symbols, slot (UL-centric slot) where the number of symbols for performing UL communication is higher than the number of symbols for performing DL communication, slot (DL-centric slot) where the number of symbols for performing UL communication is lower than the number of symbols for performing DL communication, slot (DL only slot) where DL communication is performed in all symbols).

However, in the future radio communication system supporting a plurality of slots where the time length of UL duration differs, it becomes the problem how to transmit UCI in at least one of the plurality of slots in a user terminal.

The present invention was made in view of such a respect, and it is an object of the invention to provide a user terminal and radio communication method capable of properly transmitting UCI in future radio communication systems.

Solution to Problem

One aspect of a user terminal of the present invention is characterized by being provided with a transmitting section that transmits uplink control information (UCI) in at least one of a plurality of slots with different time lengths of UL duration, and a control section that controls transmission of the UCI, where based on an explicit instruction from a radio base station or an implicit determination by the user terminal, the control section controls an uplink (UL) control channel used in transmission of the UCI.

Advantageous Effects of Invention

According to the present invention, it is possible for a user terminal to properly transmit uplink control information (UCI) in future radio communication systems.

BRIEF DESCRIPTION OF DRAWINGS

FIGS. 2A and 2B are diagrams showing one example of PUCCH configurations according to Aspect 1:

FIGS. 4A and 4B are diagrams showing a second determination example of PUCCH format/structure according to Aspect 2;

FIGS. 7A to 7D are diagrams showing determination examples of PUCCH waveform according to Aspect 2;

FIGS. 12A and 12B are diagrams showing one example of transmission control of UCI according to Aspect 3;

DESCRIPTION OF EMBODIMENTS

In future radio communication systems (5G/NR), it is studied to introduce a time unit (e.g., frame, subframe, slot, mini-slot, subslot, transmission time interval (TTI)) of a configuration different from that in the existing LTE system (prior to LTE Rel.13). For example, the subframe is a time unit having a predetermined time length (e.g., 1 ms), irrespective of numerology.

Further, the slot is a time unit based on numerology (e.g., subcarrier spacing and/or symbol length or the like) and the number of symbols. For example, in the case where the subcarrier spacing is 15 kHz or 30 kHz, the number of symbols per slot may be "7" or "14", respectively. On the other hand, in the case where the subcarrier spacing is 60 kHz or more, the number of symbols per slot may be "14". Further, the slot may include a plurality of mini-(sub)slots.

Figure 1:
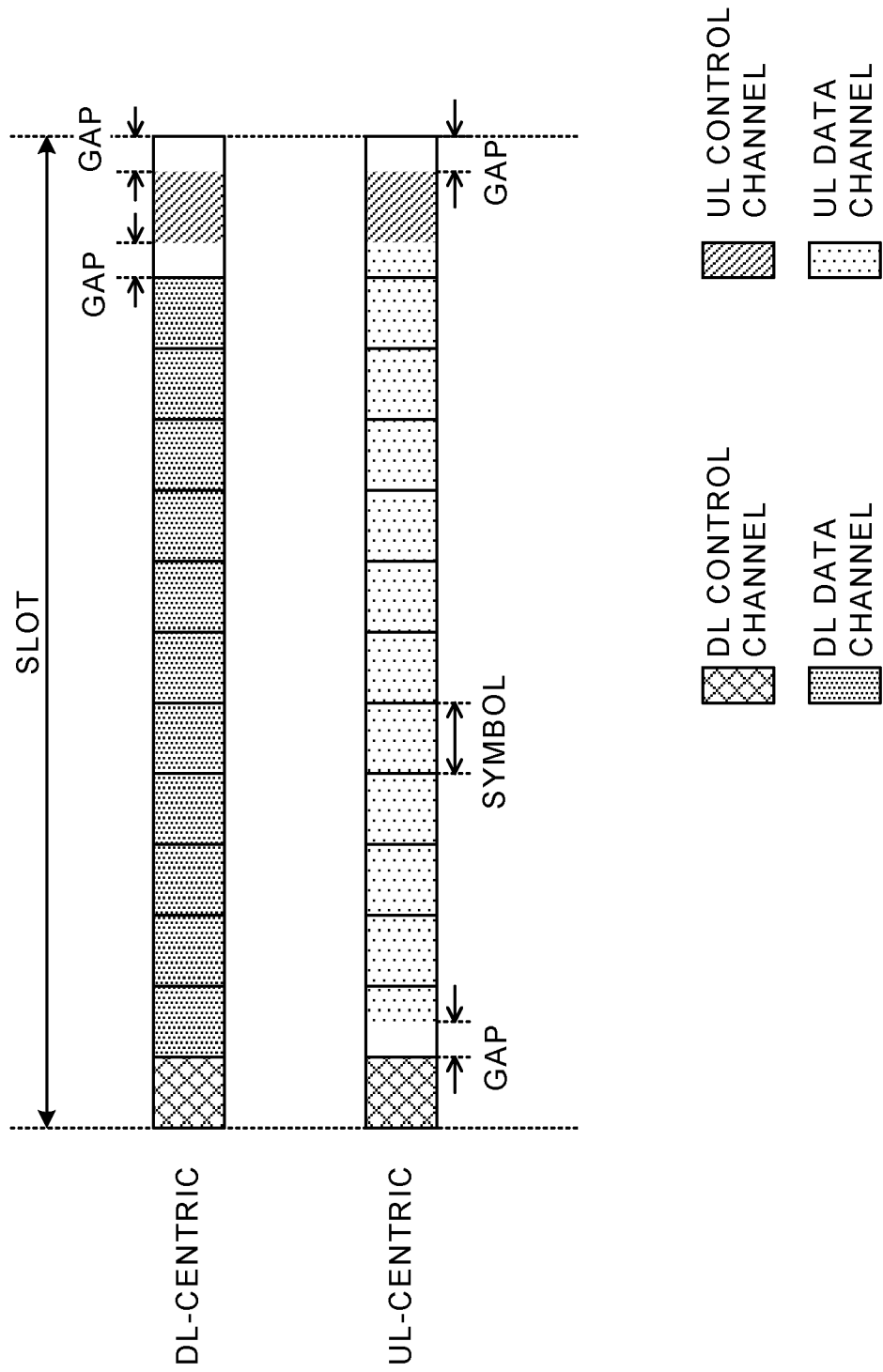
FIG. 1 is a diagram showing one example of slot configurations used in future radio communication systems.

FIG. 1 is a diagram showing one example of configurations (also called structure, type and the like) of slots used in future radio communication systems. In addition, FIG. 1 illustrates the configuration of the slot in the time domain. In addition, in FIG. 1, a DL control channel, DL data channel (also referred to as DL shared channel and the like) or UL data channel (UL shared channel, etc.) and a UL control channel are subjected to time division multiplexing, but are not limited thereto.

It is not necessary to multiplex all channels shown in FIG. 1 into a slot, and one or more channels are essentially allocated inside a slot. Further, allocation order of channels, a length of the channel in the time domain, and a length of a gap section are also not limited to those shown in FIG. 1, and are capable of being changed as appropriate.

Further, the DL data channel and/or UL data channel and DL control channel do not need to undergo time division, and may be subjected to frequency multiplexing/code multiplexing/space multiplexing. Further, the DL data channel and/or UL data channel and UL control channel are similar, do not need to undergo time division, and may be subjected to frequency multiplexing/code multiplexing/space multiplexing in the same time segment (e.g., symbol).

For example, in FIG. 1, based on downlink control information (DCI) transmitted on the DL control channel, a user terminal controls reception of the DL data channel and/or transmission of the UL data channel. As shown in FIG. 1, in a slot for receiving the DL data channel, since DL communication is performed centrically, the slot may be called a DL-centric slot and the like. On the other hand, in a slot for receiving the UL data channel, since UL communication is performed centrically, the slot may be called a UL-centric slot and the like.

Further, the user terminal may transmit retransmission control information (also referred to as HARQ-ACK: Hybrid Automatic Repeat reQuest-Acknowledge, ACK or NACK (A/N), etc.) of the DL data channel as feedback, using the UL control channel in the same slot as the DL data channel. Alternatively, the user terminal may perform feedback of the A/N, using the UL control channel or UL data channel in a subsequent slot.

Further, as shown in FIG. 1, a switch time (gap section) between DL and UL may be configured between the DL data channel and the UL control channel and/or between the DL control channel and the UL data channel. Further, the switch time (gap section) between DL and UL may be configured also between the UL control channel and start time of the next slot or frame (subframe or TTI).

Alternatively, in the channel configuration, instead of that the explicit switch time (gap section) between DL and UL is not configured between the UL control channel and start time of the next slot, during actual operation, the switch time (gap section) between UL and DL may be configured in the section by timing advance (TA) given to a UL signal. In this case, it is possible to configure the integer number of symbols such as 1 symbol, 2 symbols and 3 symbols in the gap section between the DL data channel and the UL control channel and/or between the DL control channel and the UL data channel shown in FIG. 1.

Thus, in order to enable short-time communication, assignment may be performed where control (scheduling) of transmission/reception is contained in the same slot. The assignment is also referred to as self-contained assignment. The slot with the self-contained assignment performed may be called a self-contained slot. For example, the self-contained slot may be called a self-contained subframe, self-contained TTI, self-contained symbol set and the like, or another name may be used.

In the self-contained slot, the user terminal receives the DL data channel based on the DL control channel, and may transmit HARQ-ACK of the DL data channel. By using the self-contained slot or sub frame, for example, it is possible to actualize feedback of ultra-low delay of 1 ms or less, and it is thereby possible to reduce latency.

Further, in transmission of the UL data channel, it is possible to use a slot configuration (also referred to as UL-centric and the like) where the DL control channel, UL data channel and UL control channel are allocated. Based on DCI transmitted on the DL control channel, the user terminal is capable of performing transmission of a UL signal (UL data, measurement report, etc.) in the same (or, subsequent to) slot.

Thus, in the future radio communication system, it is expected to use a plurality of slots (e.g., DL-centric slot where the UL duration is shorter than the DL duration, UL-centric slot where the UL duration is longer than the DL duration, UL only slot where UL communication is only performed, DL only slot where DL communication is only performed without the UL duration existing) where the time length of the UL duration differs in the slots.

However, in the future radio communication system expected to support a plurality of slots where the time length of UL duration differs, it becomes the problem how to transmit UCI in at least one of the plurality of slots in the user terminal.

Therefore, the inventors of the present invention studied methods of properly transmitting UCI in at least one of a plurality of slots where the time length of UL duration differs, and arrived at the invention. Specifically, the inventors of the invention conceived controlling the uplink (UL) control channel used in transmission of the UCI, based on an explicit instruction from the radio base station or an implicit determination by the user terminal.

This Embodiment will be described below in detail.

(Aspect 1)

Aspect 1 describes configurations of the UL control channel (hereinafter, abbreviated as PUCCH). The configuration (PUCCH configuration) of the PUCCH is to define a configuration required for at least one of generation processing, transmission processing and reception processing of the PUCCH.

For example, the PUCCH configuration is at least one of the time length of the PUCCH, payload, the number of symbols, the number of resource blocks (PRB: Physical Resource Block), resources (e.g., at least one of the symbol, PRB and spreading code), waveform, timing, numerology, modulation scheme, signal generation processing method such as spreading scheme, multiplexing method of a plurality of user terminals, and transmission scheme (e.g., multi-antenna transmission, simultaneous PUCCH and PUSCH transmission, UCI transmission (UCI piggyback on PUSCH) using the PUSCH and the like).

In Aspect 1, the user terminal may be configured to be able to use at least a plurality of PUCCH configurations with different time lengths. The plurality of PUCCH configurations includes at least a first PUCCH configuration comprised of a relatively short time length (e.g., 1 or 2 symbols), and a second PUCCH configuration having a time length longer than the first PUCCH configuration.

FIG. 2 contains diagrams showing one example of the PUCCH configuration according to Aspect 1. FIG. 2A shows one example of the first PUCCH configuration. As shown in FIG. 2A, the PUCCH of the first PUCCH configuration has a relatively short time length (herein, 1 symbol). In addition, in FIG. 2A, the PUCCH is allocated to the last symbol of the slot, but the position of the symbol with the PUCCH allocated is not limited thereto. Further, the time length is not limited to 1 symbol, and may be the low number of symbols up to the extent of 2 or 3 symbols.

Further, the first PUCCH configuration may use an Orthogonal Frequency Division Multiplexing (OFDM) waveform. In the case of using the OFDM waveform, it is possible to transmit the UL control channel not only in one or more contiguous PRBs, but also in a plurality of discontiguous PRBs. Further, in the case of using the OFDM waveform, it is possible to multiplex UCI and reference signal (e.g., demodulation reference signal (DM-RS: DeModulation-Reference Signal), etc.) into one symbol.

Furthermore, in the case of using the OFDM waveform, it is possible to perform transmission, using not only a precoding codebook of low Peak to Average Power Ratio (PRPR) such as DFT-s-OFDM (Discrete Fourier Transform-Spread-Orthogonal Frequency Division Multiplexing), but also a plurality of antennas.

Still furthermore, in the first PUCCH configuration, in the case where UCI and UL data occurs simultaneously, the user terminal may transmit the UCI using the PUSCH (UCI piggyback on PUSCH). Alternatively, the user terminal may perform Frequency Division Multiplexing (FDM) and/or Time Division Multiplexing (TDM) on the PUSCH used in transmission of the UL data and the PUCCH used in transmission of the UCI.

For example, it is possible to use the PUCCH Of the first PUCCH configuration in transmission of A/N of DL data received in the DL duration in the same slot, and the like. Therefore, the PUCCH of the first PUCCH configuration is effective in delay reduction.

On the other hand, FIG. 2B shows one example of the second PUCCH configuration. In addition, in FIG. 2B, the PUCCH is not allocated to the first symbol in the slot, but the PUCCH may be allocated also to the first symbol. The PUCCH Of the second PUCCH configuration is essentially allocated in the UL duration in the slot.

As shown in FIG. 2B, in the second PUCCH configuration, the time length is longer than in the first PUCCH configuration, and therefore, frequency hopping may be applied. By applying frequency hopping, it is possible to improve the quality of UCI.

Further, in the second PUCCH configuration, a DFT-S-OFDM waveform may be used. Furthermore, in DFT-S-OFDM, CAZAC (Constant Amplitude Zero Auto-Correction) sequences may be used in transmission of UCI. In the DFT-S-OFDM waveform, since PAPR is small as compared with OFDM, transmission using a plurality of antennas may be performed using a precoding codebook with low PAPR (e.g., UL MIMO codebook of the existing LTE system).

Furthermore, in the second PUCCH configuration, in the case where UCI and UL data occurs simultaneously, in principle, the user terminal may transmit the UCI using the PUSCH (UCI piggyback on PUSCH).

The second PUCCH configuration has a long time length as compared with the first PUCCH configuration, and therefore, is effective in securing UL coverage. In addition, in the second PUCCH configuration with the long time length, to obtain the power boosting effect, the number of PRBs may be set at the minimum number of PRBs (e.g., 1 or 2 PRBs). Further, not shown in the figure, the PUCCH of the second PUCCH configuration shown in FIG. 2B may be multiplexed with the PUCCH of the first PUCCH configuration shown in FIG. 2A into the same slot.

As described above, Aspect 1 supports configurations of a plurality of PUCCHs with different time lengths. Accordingly, the user terminal is capable of transmitting UCI, by selecting the PUCCH configuration corresponding to requirements and desired performance, such that in the case where there is not any significant problem with uplink coverage, the first PUCCH configuration is used for the purpose of reducing data transmission delay, and that in the case of no need of reduction in data transmission delay, the second PUCCH configuration with coverage and high robustness is used.

(Aspect 2)

Described next is operation for the user terminal to control the PUCCH used in transmission of UCI, in the case of transmitting the UCI in at least one of a plurality of slots with different time lengths of UL duration.

Specifically, based on an explicit instruction from the radio base station or an implicit determination by the user terminal, the user terminal determines a parameter (PUCCH parameter) on the PUCCH, and based on the parameter, may control the PUCCH.

Herein, the PUCCH parameter may be a parameter defined by the PUCCH configuration according to Aspect 1. Further, for example, the PUCCH parameter may be a parameter defined by at least one of PUCCH format, PUCCH structure, PUCCH resource, PUCCH waveform, PUCCH numerology (e.g., subcarrier spacing), and PUCCH timing.

For example, the PUCCH format may include at least one of information (e.g., long duration, short duration or the like) indicative of a time length of the PUCCH, payload (e.g., large payload, small payload or the like) and the like. Further, the PUCCH structure may include at least one of the number of symbols of the PUCCH, the number of resource blocks (PRB: Physical Resource Block) and the like.

Further, for example, the PUCCH resource may include at least one of a symbol (or, index or number of the symbol), PRB (or, index of PRB), spreading code and the like. Furthermore, the PUCCH waveform may include one of DFT-s-OFDM and OFDM.

Moreover, the PUCCH timing may include at least one of transmission timing (e.g., slot number, symbol number, period, etc.) of A/N of DL data and/or UL data, and transmission timing (e.g., slot number, symbol number, period, etc.) of CSI. Furthermore, for example, the PUCCH numerology may include at least one of subcarrier spacing used in the PUCCH, symbol length, CP length and the like.

In the following description, operation will be described where the user terminal determines the above-mentioned PUCCH format and/or PUCCH structure (hereinafter, referred to as PUCCH format/structure), the above-mentioned PUCCH resource, the above-mentioned PUCCH waveform, the above-mentioned PUCCH timing, and at least one parameter (PUCCH parameter) included in the above-mentioned numerology, based on an explicit instruction from the radio base station or an implicit determination by the user terminal.

PUCCH Format/Structure

The PUCCH format/structure may be determined by higher layer signaling (e.g., system information or RRC signaling) and/or physical layer signaling (e.g., DL control channel or DCI).

Specifically, based on at least one of information (UL duration information) indicative of a time length of UL duration in a slot, instruction information from the radio base station to indicate the PUCCH format/structure differently from the UL duration information, and descriptions (e.g., the number of transmission times of DL data in the case where UCI includes A/N to the DL data) of the UCI, the user terminal determines the PUCCH format/structure (at least one of information (e.g., long duration, short duration or the like) indicative of the time length of the PUCCH, payload of the PUCCH, the number of symbols of the PUCCH, and the number of PRBs of the PUCCH).

First Determination Example

In the first determination example, based on the above-mentioned UL duration information, the user terminal determines the PUCCH format/structure. Herein, for example, the UL duration information may be a slot type indicative of DL only slot, DL-centric slot, UL only slot, UL-centric slot and the like.

In the first determination example, the PUCCH format/structure is associated with (tied to) the UL duration information. The association of the PUCCH format/structure with the UL duration information may be beforehand defined by specifications, or may be configured by higher layer signaling and/or physical layer signaling. The user terminal may determine the PUCCH format/structure (e.g., PUCCH with different duration) corresponding to the UL duration information.

FIG. 3 contains diagrams showing the first determination example of PUCCH format/structure according to Aspect 2. In FIG. 3, as one example, it is assumed that the DL-centric slot is beforehand associated with the PUCCH of short duration, and that the UL-centric slot and UL only slot are beforehand associated with the PUCCH of long duration, but the invention is not limited thereto.

Figure 3A:
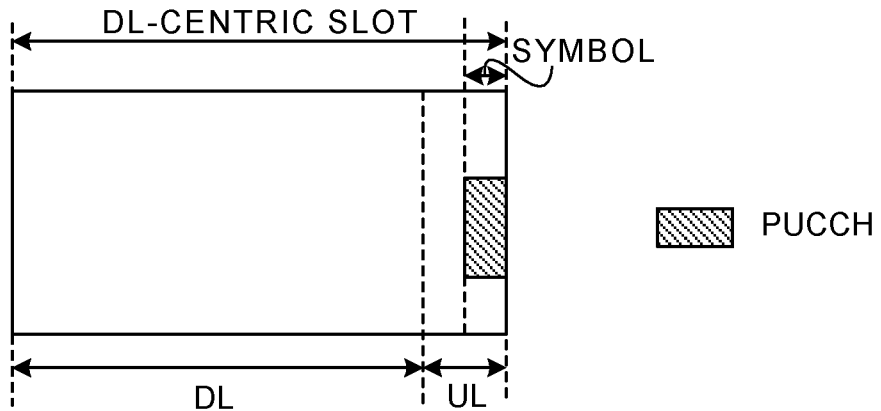
FIGS. 3A to 3C are diagrams showing a first determination example of PUCCH format/structure according to Aspect 2.
Figure 3B:
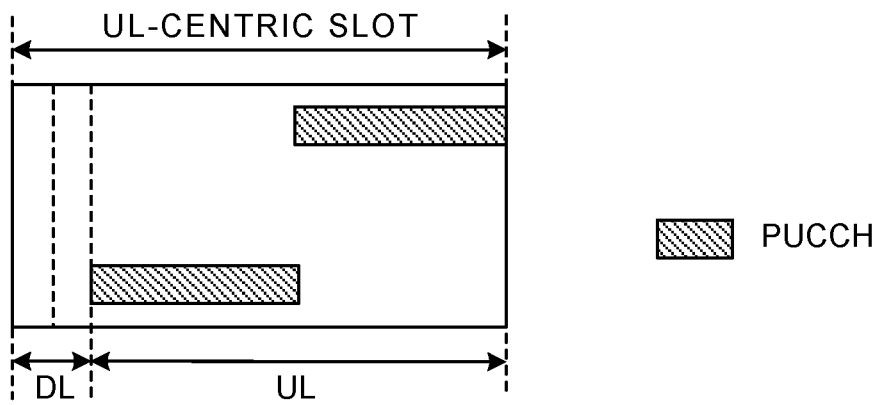
Figure 3C:
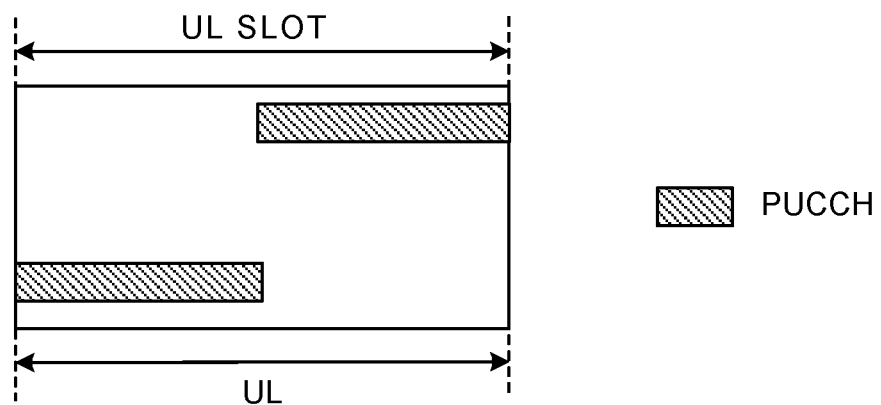

For example, as shown in FIG. 3A, in the case where the slot type is the DL-centric slot, the user terminal may determine to use the PUCCH of short duration. As shown in FIG. 3B, in the case where the slot type is the UL-centric slot, the user terminal may determine to use the PUCCH of long duration. As shown in FIG. 3C, in the case where the slot type is the UL only slot, the user terminal may determine to use the PUCCH of long duration. Although not shown in the figure, in the case where the slot type is the DL only slot, the PUCCH is not transmitted.

In addition, a plurality of PUCCHs of long duration with different time lengths as shown in FIGS. 3B and 3C may be different PUCCH formats, or may be specified to different time lengths by the same PUCCH format. In both, by making generation of RS mapping pattern and RS sequence, scrambling method, mapping pattern of UCI and the like common, it is possible to decrease the implementation load of the terminal. Alternatively, in both, by allowing different design in generation of RS mapping pattern and RS sequence, scrambling method, mapping pattern of UCI and the like, it is possible to make feedback of UCI with a proper PUCCH format adapted to respective PUCCH transmission length.

Second Determination Example

In the second determination example, based on the instruction information for indicating the PUCCH format/structure differently from the above-mentioned UL duration information, the user terminal determines the PUCCH format/structure. The instruction information is information for explicitly indicating the PUCCH format/structure, and may be configured by higher layer signaling and/or physical layer signaling.

FIG. 4 contains diagrams showing the second determination example of PUCCH format/structure according to Aspect 2. As shown in FIG. 4A, in the case where the slot type is the UL-centric slot, based on the instruction information for indicating the PUCCH format/structure, the user terminal may determine whether to use the PUCCH of short duration or the PUCCH of long duration (or may switch).

As shown in FIG. 4B, in the case where the slot type is the UL only slot, based on the instruction information for indicating the PUCCH format/structure, the user terminal may determine to use the PUCCH of short duration, the PUCCH of first long duration or the PUCCH of second long duration (may switch).

In the case where the slot type is the DL-centric slot, as in the first determination example, the user terminal may determine to use the PUCCH of short duration based on the slot type. Thus, based on the UL duration information (e.g., slot type) and the above-mentioned instruction information, the user terminal may determine the PUCCH format/structure.

As the above-mentioned indicator (instruction information), for example, it is possible to use a partial field (e.g., 2 bits) of the DCI (DL assignment) for scheduling DL data. In this case, based on the UL duration information of the slot for transmitting the PUCCH, it is possible to interpret the field. For example, in the case where the slot is the DL-centric slot with short UL duration, irrespective of the value of the field, it is determined to transmit the PUCCH of short duration, and in the case where the slot is the UL-centric or UL only with long UL duration, based on the value of the field, it is possible to transmit the PUCCH of short duration or the PUCCH of long duration. Alternatively, using a partial field (e.g., 2 bits) of the DCI (DL assignment), the station may designate a combination of the UL duration information of the slot for transmitting the PUCCH and PUCCH format/structure.

Third Determination Example

In the third determination example, based on the UCI type to transmit on the PUCCH, the user terminal determines the PUCCH format/structure. The UCI type indicates descriptions of the UCI, and for example, may indicate at least one of A/N to the DL data channel, scheduling request (SR), and channel state information (CSI).

Specifically, based on the information (e.g., the number of transmission times of the DL data channel) on the DL data channel on which feedback of A/N is performed, the user terminal may determine the PUCCH format/structure.

Figure 5A:
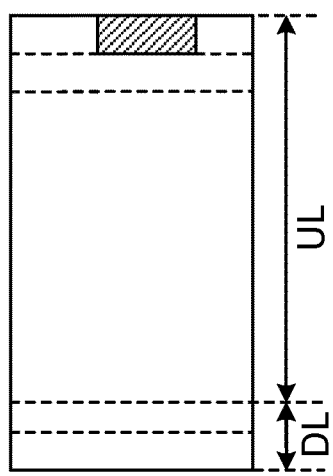
FIGS. 5A and 5B are diagrams showing a third determination example of PUCCH format/structure according to Aspect 2.
Figure 5B:
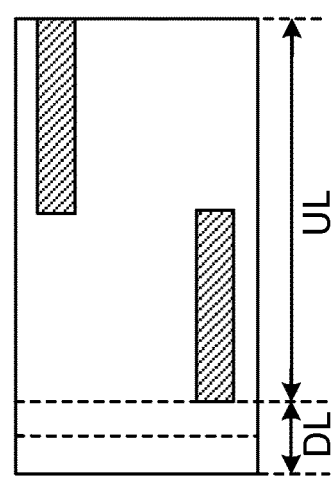

FIG. 5 contains diagrams showing the third determination example of PUCCH format/structure according to Aspect 2. FIGS. 5A and 5B illustrate the example where the user terminal determines the PUCCH format/structure, based on a result of comparing the number of transmission times of the DL data channel with a predetermined threshold N.

As shown in FIG. 5A, in the case where the slot type is the UL-centric slot or UL only slot and the number of transmission times of the DL data channel is less than N (e.g., initial transmission), the user terminal may determine to use the PUCCH of short duration in transmission of A/N to the DL data channel.

On the other hand, as shown in FIG. 5B, in the case where the slot type is the UL-centric slot or UL only slot and the number of transmission times of the DL data channel is N or more, the user terminal may determine to use the PUCCH of long duration in transmission of A/N to the DL data channel.

Herein, the predetermined threshold N is an integer of "1" or more, and may be beforehand determined, or may be configured by higher layer signaling and/or physical layer signaling. Further, the number N of transmission times of the DL data channel may be configured for each user terminal individually, or may be configured to be common.

In addition, in the case where the slot type is the DL-centric slot, as in the first determination example, the user terminal may determine to use the PUCCH of short duration based on the slot type. Thus, based on the UL duration information (e.g., slot type) and the number of transmission times of the DL data channel, the user terminal may determine the PUCCH format/structure.

In the third determination example, unless any error occurs in the decoding result of the DL data channel, since the PUCCH of short duration is used, it is possible to actualize efficient usage of UL resources.

Fourth Determination Example

In the fourth determination example, based on the payload (also referred to as information amount, the number of information bits and the like) of UCI to transmit on the PUCCH, the user terminal determines the PUCCH format/structure.

Figure 6A:
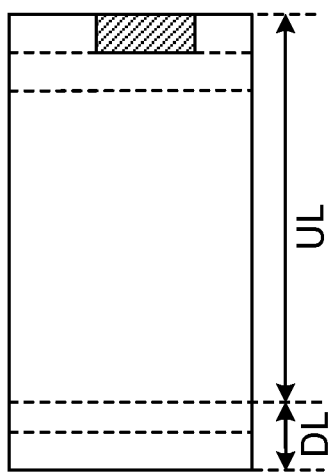
FIGS. 6A and 6B are diagrams showing a fourth determination example of PUCCH format/structure according to Aspect 2.
Figure 6B:
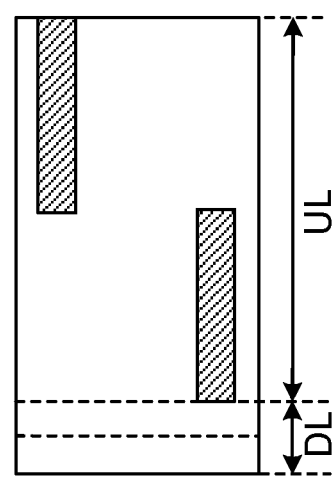

FIG. 6 contains diagrams showing the fourth determination example of PUCCH format/structure according to Aspect 2. FIGS. 6A and 6B illustrate the example where the user terminal determines the PUCCH format/structure, based on a result of comparing the above-mentioned payload of UCI with a predetermined threshold.

As shown in FIG. 6A, in the case where the slot type is the UL-centric slot or UL only slot and the payload of UCI is less than the predetermined threshold, the user terminal may determine to use the PUCCH of short duration in transmission of the UCI.

On the other hand, as shown in FIG. 6B, in the case where the slot type is the UL-centric slot or UL only slot and the payload of UCI is the predetermined threshold or more, the user terminal may determine to use the PUCCH of long duration in transmission of the UCI.

Herein, the predetermined threshold on the payload is an integer of "1" or more, and may be beforehand determined, or may be configured by higher layer signaling and/or physical layer signaling. Further, the predetermined threshold may be configured for each user terminal individually, or may be configured to be common. Furthermore, the predetermined threshold may be used to switch a channel coding scheme, interleaving method, transmit power control scheme and the like. By this means, it is possible to actualize proper performance, corresponding to the PUCCH format/structure switched by the predetermined threshold.

In addition, in the case where the slot type is the DL-centric slot, as in the first determination example, the user terminal may determine to use the PUCCH of short duration based on the slot type. Thus, based on the UL duration information (e.g., slot type) and the payload of UCI, the user terminal may determine the PUCCH format/structure.

In the fourth determination example, as long as the payload of UCI is smaller than the predetermined threshold, since the PUCCH of short duration is used, it is possible to actualize efficient usage of UL resources.

PUCCH Resource

The PUCCH resource used in mapping and/or transmission of the PUCCH may be determined by higher layer signaling (e.g., system information or RRC signaling) and/or physical layer signaling (e.g., DL Herein, the PUCCH resource is comprised of at least one of one or more resource units (frequency resource units) in the frequency domain, one or more resource units (time resource units) in the time domain, and one or more code resources.

One or more frequency resource units (e.g., resource block, PRB) constituting the PUCCH resource may be contiguous or discontiguous in the frequency domain. Further, one or more time resource units (e.g., symbol) constituting the PUCCH resource may be contiguous or discontiguous in the time domain.

Further, the one or more code resources constituting the PUCCH resource may be a code (e.g., spreading code such as Orthogonal Cover Code (OCC)) multiplied by each signal multiplexed in the same frequency resource unit and/or time resource unit.

Furthermore, the PUCCH resource may be a set of one or more resource units (e.g., resource block (RB), PRB) in the frequency domain to/in which one or more PUCCHs are mapped and/or transmitted. In addition, the one or more resource units may be contiguous or discontiguous in the frequency domain.

The user terminal may determine the PUCCH resource, based on at least one of a resource index·symbol index·RS (or beam) index of the downlink control channel, a resource index·symbol index (to start downlink data channel transmission/reception)·RS (or beam) index of the downlink data channel, and the like. In this case, it is possible to eliminate the need of signaling for designating the PUCCH resource. Further, based on a value of a partial field of the control signal transmitted/received on the downlink control channel, the PUCCH resource may be determined. In this case, it is possible to perform flexible PUCCH resource allocation which is not dependent on parameters of the control channel and data channel.

PUCCH Waveform

The waveform (PUCCH waveform) used in transmission of the PUCCH may be determined by higher layer signaling (e.g., system information or RRC signaling) and/or physical layer signaling (e.g., DL control channel or DCI). For example, the PUCCH waveform is OFDM (CP-OFDM), DFT-s-OFDM or the like, but is not limited thereto.

Specifically, based on at least one of the above-mentioned PUCCH format/structure (e.g., information (e.g., long duration or short duration) indicative of a time length of the PUCCH or the number of symbols constituting the PUCCH), instruction information for explicitly indicating the PUCCH waveform differently from the UL duration information and/or PUCCH format/structure, and the waveform (PUSCH waveform) of the PUSCH, the user terminal determines the PUCCH waveform.

FIG. 7 contains diagrams showing a determination example of the PUCCH waveform according to Aspect 2. For example, in FIG. 7A, the PUCCH waveform is associated with (tied to) the information (e.g., long duration or short duration) indicative of the time length of the PUCCH. The association of the PUCCH wave form with the information indicative of the time length of the PUCCH may be beforehand defined by specifications, or may be configured by higher layer signaling and/or physical layer signaling.

In FIG. 7A, the user terminal determines that the PUCCH waveform is a PUCCH waveform that corresponds to the time length of the PUCCH. For example, in the case of the PUCCH of short duration, the user terminal may determine that the PUCCH waveform is OFDM. On the other hand, in the case of the PUCCH of long duration, the user terminal may determine that the PUCCH waveform is DFT-s-OFDM.

Further, as shown in FIG. 7B, the PUCCH waveform may be associated with the number of symbols constituting the PUCCH. The association of the PUCCH waveform with the number of symbols constituting the PUCCH may be beforehand defined by specifications, or may be configured by higher layer signaling and/or physical layer signaling.

In FIG. 7B, the user terminal determines that the PUCCH waveform is a PUCCH waveform that corresponds to the number of symbols of the PUCCH. For example, in the case where the number of symbols is less than a predetermined threshold N (or N or less), the user terminal may determine that the PUCCH waveform is OFDM. On the other hand, in the case where the number of symbols is the predetermined threshold N or more (or exceeds N), the user terminal may determine that the PUCCH waveform is DFT-s-OFDM.

Alternatively, as shown in FIG. 7C, based on the instruction information for explicitly indicating the PUCCH waveform, the PUCCH waveform may be determined. For example, as shown in FIG. 7C, the instruction information may be a bit field of the predetermined number of bits representing OFDM or DFT-s-OFDM.

In FIG. 7C, irrespective of the above-mentioned PUCCH format/structure, based on the instruction information, the user terminal determines the PUCCH waveform. For example, even in the case of using the PUCCH of short duration, when the instruction information indicates DFT-s-OFDM, the user terminal may determine that the PUCCH waveform is DFT-s-OFDM. On the other hand, even in the case of using the PUCCH of long duration, when the instruction information indicates OFDM, the user terminal may determine that the PUCCH waveform is OFDM.

Alternatively, as shown in FIG. 7D, based on the PUSCH waveform in the same slot or a predetermined slot, the PUCCH waveform may be determined. In FIG. 7D, the user terminal determines that the PUCCH waveform is the same waveform as the PUSCH waveform in the same slot. For example, in the case where the PUSCH waveform is DFT-s-OFDM, the user terminal may determine that the PUCCH waveform is also DFT-s-OFDM. In the case where the PUSCH waveform is OFDM, the user terminal may determine that the PUCCH waveform is also OFDM.

PUCCH Timing

Transmission timing (PUCCH timing) of the PUCCH may be beforehand defined by specifications, or may be determined by higher layer signaling (e.g., system information or RRC signaling) and/or physical layer signaling (e.g., DL control channel or DCI).

Specifically, as the PUCCH timing, the user terminal may control a slot (transmission slot) for transmitting the PUCCH. Control of the transmission slot may be applied to all slot types (e.g., DL-centric slot, UL-centric slot, UL only slot) supporting transmission of the PUCCH.

For example, k slots (k≥0) later after the reception slot of a PDSCH, the user terminal may determine the transmission slot of A/N of the PDSCH using the PUCCH. Alternatively, based on a period (e.g., transmission period of periodical CSI) notified by higher layer signaling, the user terminal may determine the transmission slot of periodical CSI Using the PUCCH.

Further, as the PUCCH timing, the user terminal may control a symbol (transmission symbol) for transmitting the PUCCH in the transmission slot determined as described above. Herein, control of the transmission slot may be applied to the slot type having long UL duration such as the UL-centric slot and UL only slot.

FIG. 8 contains diagrams showing one example of PUCCH timing according to Aspect 2. For example, FIGS. 8A to 8D illustrate transmission slots of the PUCCH as UL timings 1 to 4. Further, each of FIGS. 8A to 8D illustrates a transmission symbol of the PUCCH in each transmission slot. For example, as the transmission symbol of the PUCCH, FIG. 8A illustrates the first symbol in the slot, FIG.

Figure 8A:
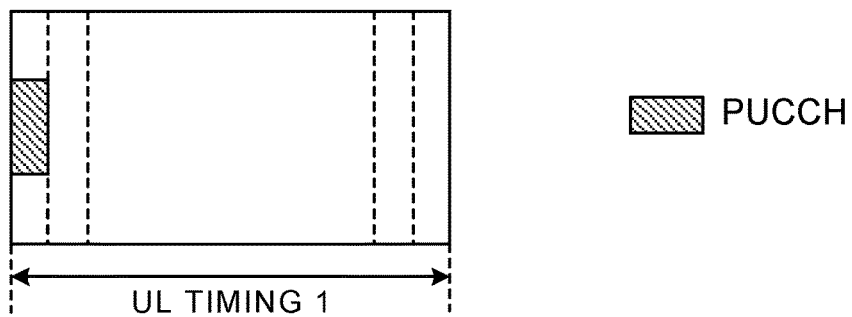
FIGS. 8A to 8D are diagrams showing one example of PUCCH timing according to Aspect 2.
Figure 8B:
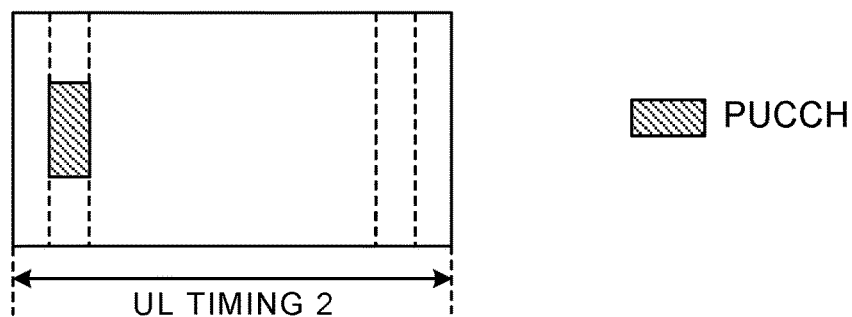
Figure 8C:
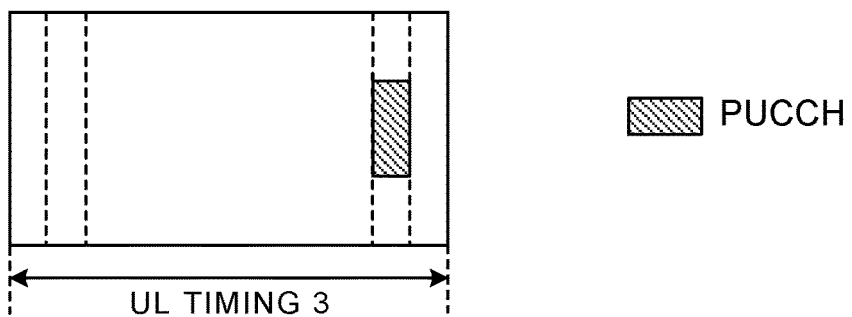
Figure 8D:
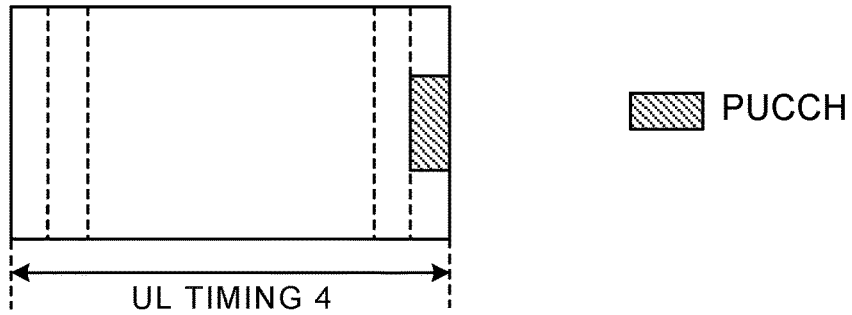

8B illustrates the second symbol from the beginning, FIG. 8C illustrates the second symbol from the last, and FIG. 8D illustrates the last symbol.

As shown in FIGS. 8A and 8B, in the case of determining a temporally early symbol in a slot as the transmission timing of the PUCCH, it is possible to increase the processing time on the network side (e.g., radio base station). On the other hand, as shown in FIGS. 8C and 8D, in the case of determining a temporally late symbol in a slot, it is possible to increase the processing time on the user terminal side.

In addition, transmission symbols of the PUCCH (PUCCH timing in the slot) shown in FIGS. 8A to 8D are only illustrative, and are not limited thereto. In FIGS. 8A to 8D, one transmission symbol is shown in each transmission slot, but a plurality of transmission symbols may be provided in each transmission slot. In the plurality of transmission symbols, PUCCHs of a plurality of user terminals may be transmitted, or a plurality of PUCCHs of a single user terminal may be transmitted.

Thus, in the case where a plurality of PUCCH timings is provided in a slot, based on the above-mentioned UCI type, the user terminal may determine the PUCCH timing in the slot.

Figure 9:
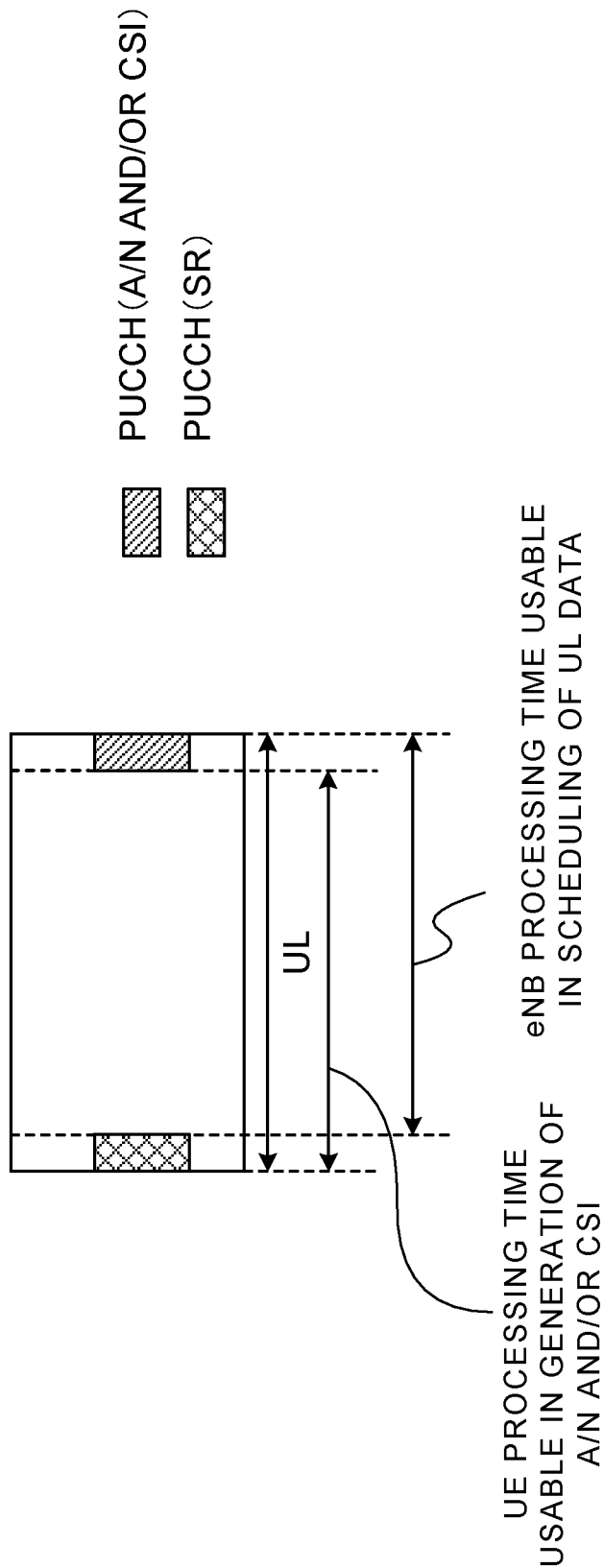
FIG. 9 is a diagram showing a determination example of PUCCH timing in a slot according to Aspect 2.

FIG. 9 is a diagram showing a determination example of PUCCH timing in a slot according to Aspect 2. In FIG. 9, as the PUCCH timing in a UL only slot, a plurality of transmission symbols (herein, the first symbol and last symbol) is illustrated, and is applicable to the other slot types as appropriate.

As shown in FIG. 9, in the case where the UCI type is a scheduling request (SR), the user terminal may determine the first symbol, as the PUCCH timing in the slot. By this means, it is possible to use second and subsequent symbols from the beginning in scheduling of the PUSCH in the radio base station, and it is possible to shorten the time required for scheduling the PUSCH to the user terminal.

On the other hand, in the case where the UCI type is A/N and/or CSI, the user terminal may determine the last symbol, as the PUCCH timing in the slot. By this means, it is possible to use symbols of from the first to the second from the last in generation of A/N and/or CSI in the user terminal, and it is possible to shorten the time required for transmitting feedback of A/N and/or CSI to the radio base station.

PUCCH Numerology

The numerology (PUCCH numerology) of the PUCCH may be determined by higher layer signaling (e.g., system information or RRC signaling) and/or physical layer signaling (e.g., DL control channel or DCI). Further, unless there is any instruction particularly, the user terminal may transmit the PUCCH, by assuming that the PUCCH numerology is the same as one of the downlink control channel, downlink data channel and the uplink data channel, or is the same as all of numerology.

Herein, the numerology is a communication parameter (e.g., at least one of subcarrier spacing (SCS: Sub Carrier Spacing), symbol length, time length (CP length) of CP, time length (slot length) of a slot, the number of symbols per slot, filtering processing, windowing processing and the like) in the frequency domain and/or the time domain.

Figure 10A:
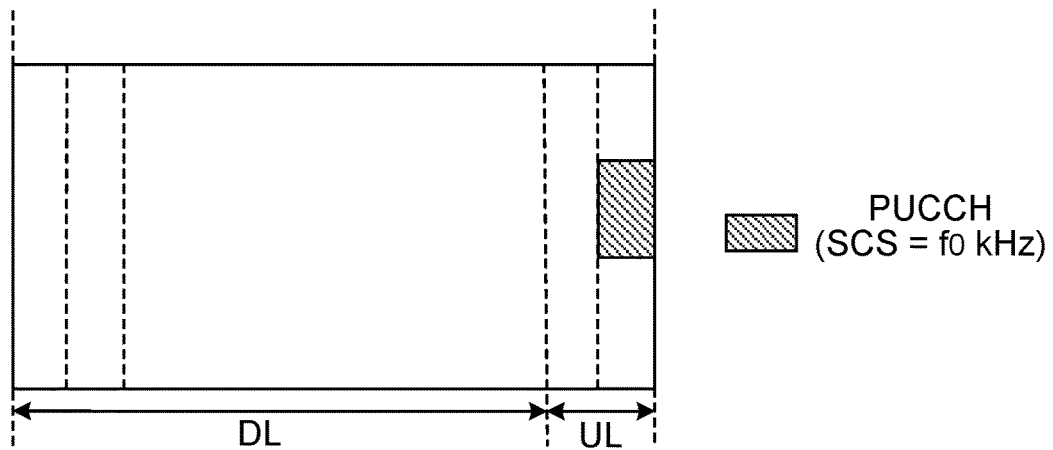
FIGS. 10A to 10C are diagrams showing one example of PUCCH numerology according to Aspect 2.
Figure 10B:
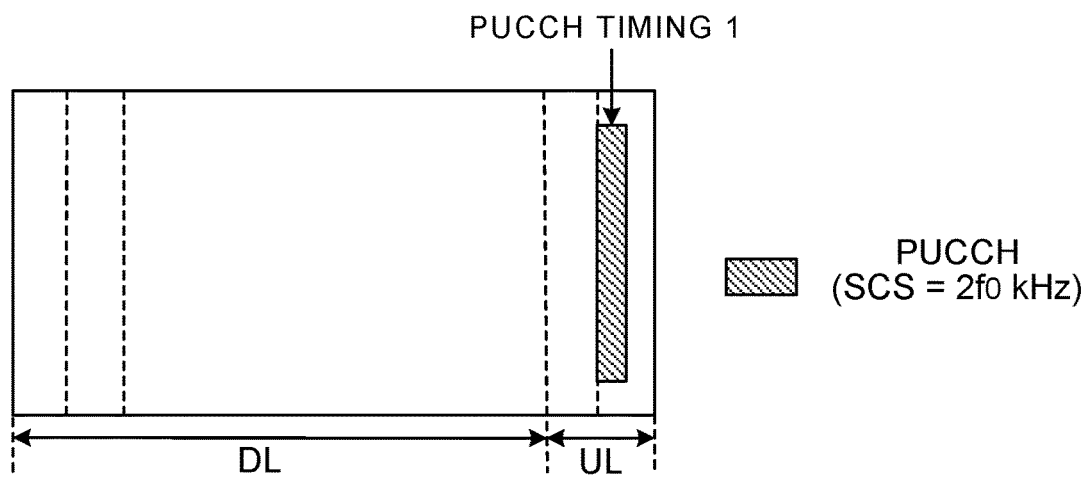
Figure 10C:
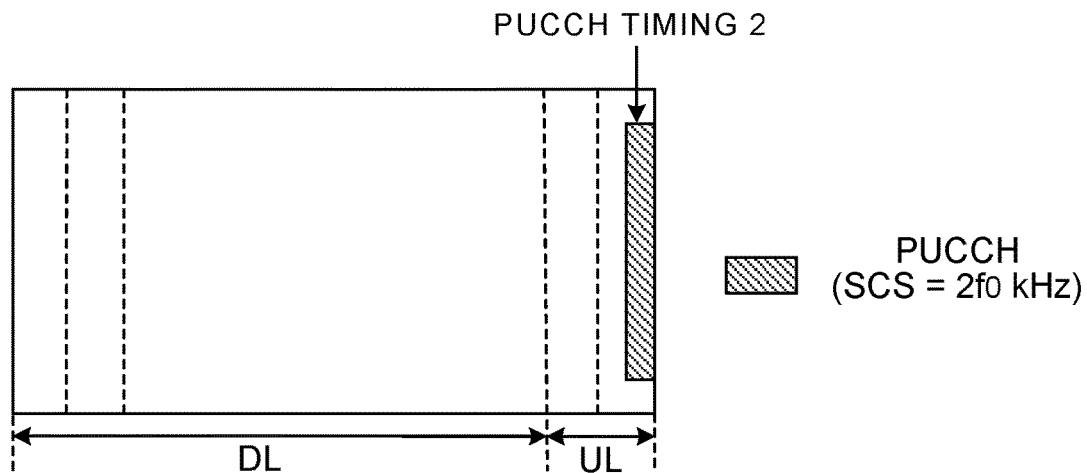

FIG. 10 contains diagrams showing one example of PUCCH numerology according to Aspect 2. FIGS. 10A to 10C illustrate the case where the subcarrier spacing, symbol length and slot length differ as the numerology as one example. Further, in FIGS. 10A to 10C, it is assumed that the subcarrier spacing used in data (PUSCH and/or PDSCH) is $f_0$.

For example, it is assumed that in FIG. 10A, the PUCCH with the same subcarrier spacing $f_0$ as the spacing of data is used, and that in FIGS. 10B and 10C, the PUCCH with subcarrier spacing $2f_0$ twice the spacing of data is used. The subcarrier spacing and the symbol length are in the reciprocal relationship, and therefore, in FIGS. 10B and 10C, the PUCCH symbol length is one-half the symbol length of the data. Thus, in the data and PUCCH in the same slot, the same or different subcarrier spacing may be used.

As shown in FIGS. 10B and 10C, in the case of using the subcarrier spacing wider than the subcarrier spacing of the data in the PUCCH, a plurality of PUCCH timings occurs inside one symbol for the data. For example, in FIG. 10B, since the subcarrier spacing $2f_0$ of the PUCCH is twice the subcarrier spacing $f_0$ of the data, two PUCCH transmission timings 1, 2 occur inside one symbol of the data.

Therefore, based on the numerology, the user terminal may determine the PUCCH timing. Further, based on both the above-mentioned UCI type and the numerology, the user terminal may determine the PUCCH timing.

DCI

It is expected that at least one of the above-mentioned PUCCH format/structure, PUCCH resource, PUCCH numerology, and PUCCH timing may be dynamically designated, and therefore, it becomes the problem how to configure DCI. Then, the DCI for indicating the PUCCH parameter as described above will be described.

Figure 11A:
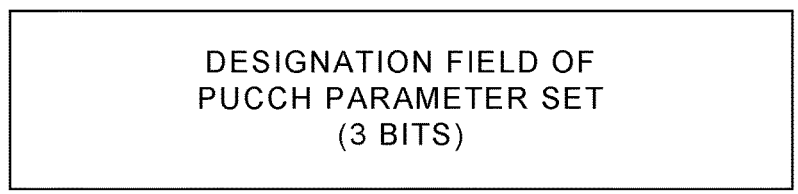
FIGS. 11A to 11C are diagrams showing one example of DCI according to Aspect 2.

FIG. 11 contains diagrams showing one example of DCI according Aspect 2. As shown in FIG. 11A, the DCI may be provided with a single designation field for designating one or more PUCCH parameters. The designation field may designate a set (PUCCH parameter set) comprised of at least one of parameters included in the above-mentioned PUCCH format/structure, PUCCH resource, PUCCH numerology, and PUCCH timing.

For example, as shown in FIG. 11A, in the case of providing a designation field of 3 bits, it is possible to designate maximum eight types of combinations of PUCCH parameter values in the PUCCH parameter set. In addition, in FIG. 11A, the combination of PUCCH parameter values that corresponds to each value of the single designation field may be defined by specifications, or may be configured by higher layer signaling.

Figure 11B:
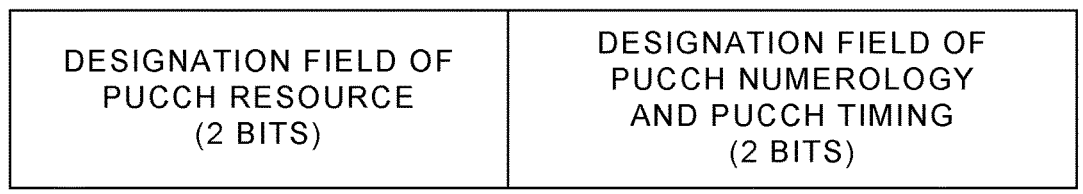

Alternatively, as shown in FIG. 11B, the DCI may be provided with a designation field for designating a single PUCCH parameter, and another designation field for designating a plurality of PUCCH parameters. For example, in FIG. 11B, provided are a designation field of 2 bits for designating the PUCCH resource, and another designation field of 2 bits for designating the combination of PUCCH numerology and PUCCH timing.

Figure 11C:
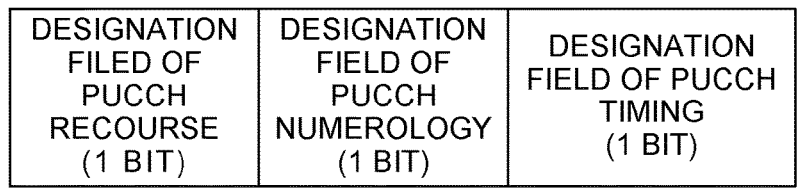

Alternatively, as shown in FIG. 11C, the DCI may be provided with a designation field for each PUCCH parameter. For example, in FIG. 11C, provided are a designation field of 1 bit for designating the PUCCH resource, another designation field of 1 bit for designating PUCCH numerology, and still another designation field of 1 bit for designating PUCCH timing.

In addition, in FIGS. 11B and 11C, the PUCCH parameter value (or, combination of PUCCH parameter values) that corresponds to each value of each designation field may be beforehand defined by specifications, or may be configured by higher layer signaling.

(Aspect 3)

Aspect 3 describes transmission control of UCI in a slot assigned the PUSCH. Based on the PUSCH waveform and/or whether or not PUCCH transmission and PUSCH transmission temporally overlaps, the user terminal may determine to use the PUSCH or the PUCCH to transmit UCI.

FIG. 12 contains diagrams showing one example of transmission control of UCI according to Aspect 3. FIGS. 12A and 12B illustrate the case where the PUSCH waveform is DFT-s-OFDM, and PUCCH transmission and PUSCH transmission temporally overlaps.

As shown in FIGS. 12A and 12B, in either case where the PUSCH waveform is DFT-s-OFDM or OFDM, it is assumed that the predetermined number of frequency resource units (e.g., 6 PRBs) of the last symbol of the slot is secured as the PUCCH resource. In addition, it is assumed that at least apart (e.g., 2 PRBs) of the PUCCH resource secured in the last symbol is usable in the PUSCH. Further, it is assumed that resources except the PUCCH resource of the last symbol are usable in the PUSCH.

As shown in FIG. 12A, in the case where the PUSCH waveform is DFT-s-OFDM and PUCCH transmission and PUSCH transmission temporally overlaps, the user terminal may transmit UCI using the PUSCH (piggybacked on PUSCH). In this case, the frequency resource units secured for the PUCCH in the last symbol may be used in the PUSCH.

Alternatively, as shown in FIG. 12B, in the case where the PUSCH waveform is DFT-s-OFDM and PUCCH transmission and PUSCH transmission temporally overlaps, the user terminal may transmit UCI using the PUCCH. In this case, at least a part (e.g., 4 PRBs) of the secured PUCCH resource may be used in PUCCH transmission.

Figure 13A:
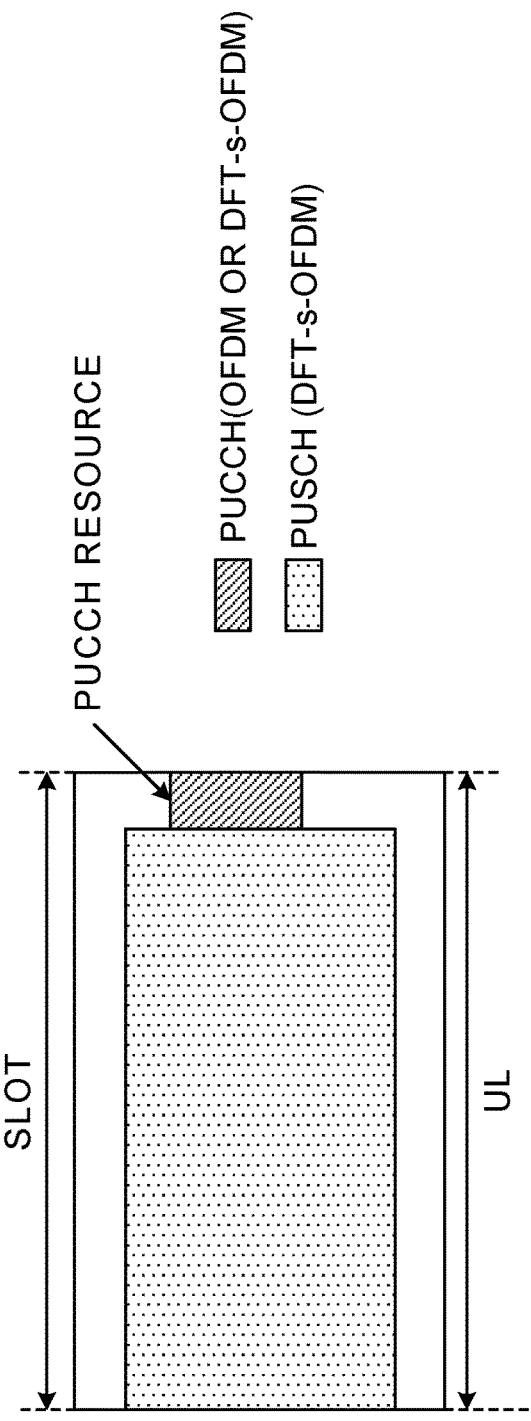
FIGS. 13A and 13B are diagrams showing another example of transmission control of UCI according to Aspect 3.
Figure 13B:
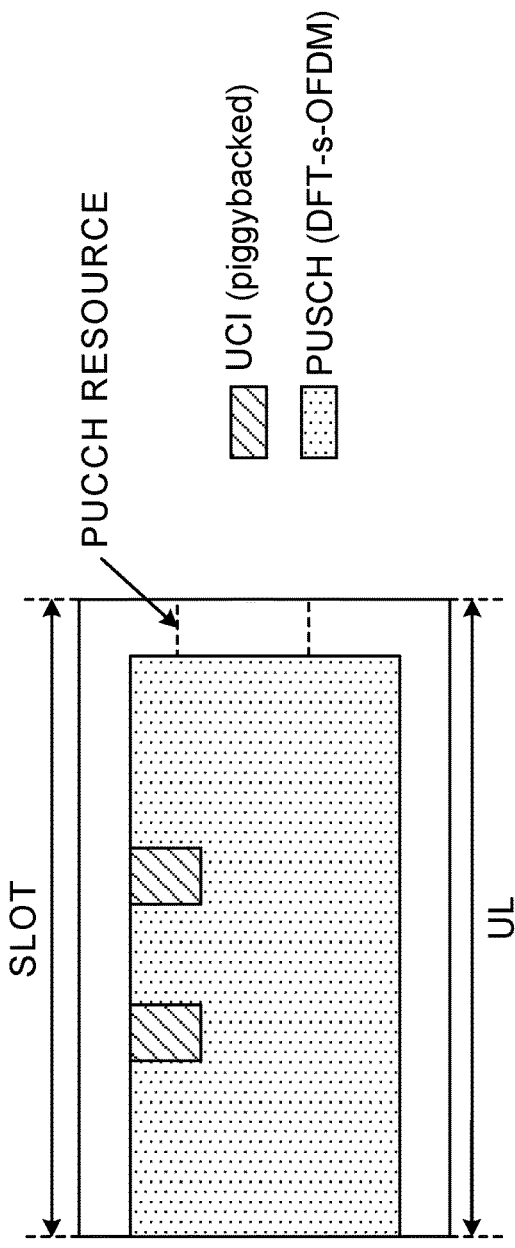

FIG. 13 contains diagrams showing another example of transmission control of UCI according to Aspect 3. FIGS. 13A and 13B illustrate the case where the PUSCH waveform is DFT-s-OFDM, and PUCCH transmission and PUSCH transmission does not overlap temporally (i.e., the case of being time division multiplexed into different symbols). Also in FIGS. 13A and 13B, as in FIGS. 12A and 12B, it is assumed that the PUCCH resource is secured in the last symbol of the slot.

As shown in FIG. 13A, in the case where the PUSCH waveform is DFT-s-OFDM and PUCCH transmission and PUSCH transmission does not overlap temporally, the user terminal may transmit UCI using the PUSCH (piggybacked on PUSCH).

Alternatively, as shown in FIG. 13B, in the case where the PUSCH waveform is DFT-s-OFDM and PUCCH transmission and PUSCH transmission does not overlap temporally, the user terminal may transmit UCI using the PUCCH. In this case, at least a part (e.g., 4 symbols) of the secured PUCCH resource may be used.

(Other Aspect)

The other Aspect describes transmission control of UCI in a slot for transmitting a Sounding Reference Signal (SRS) of a channel state. Transmission of SRS may be configured by higher layer signaling, or may be designated by physical layer signaling. In the case of the higher layer signaling, for example, the SRS may be configured in the last symbol, or in the case where the gap section is specified in the last of the slot, the SRS may be configured in a nearest position to the gap section.

Further, the UCI and SRS may be multiplexed. For example, the UCI and SRS transmitted on the PUCCH may be time division multiplexed into different symbols in the same slot. Alternatively, the UCI and SRS transmitted on the PUCCH may be frequency division multiplexed into the same symbol in the same slot.

Furthermore, numerology (SRS numerology) used in transmission of SRS may be associated with (tied to) numerology of other channels (e.g., at least one of PUCCH, PDSCH, PUSCH and PDCCH) in the same slot, or may be configured independently of the other channels. For example, it is suitable for frequency division multiplexing of the PUCCH and SRS to make the SRS numerology and PUCCH numerology the same as each other.

Radio Communication System

A configuration of a radio communication system according to this Embodiment will be described below. In the radio communication system, the radio communication method according to each of the above-mentioned Aspects is applied. In addition, the radio communication method according to each of the above-mentioned Aspects may be applied alone, or may be applied in combination.

Figure 14:
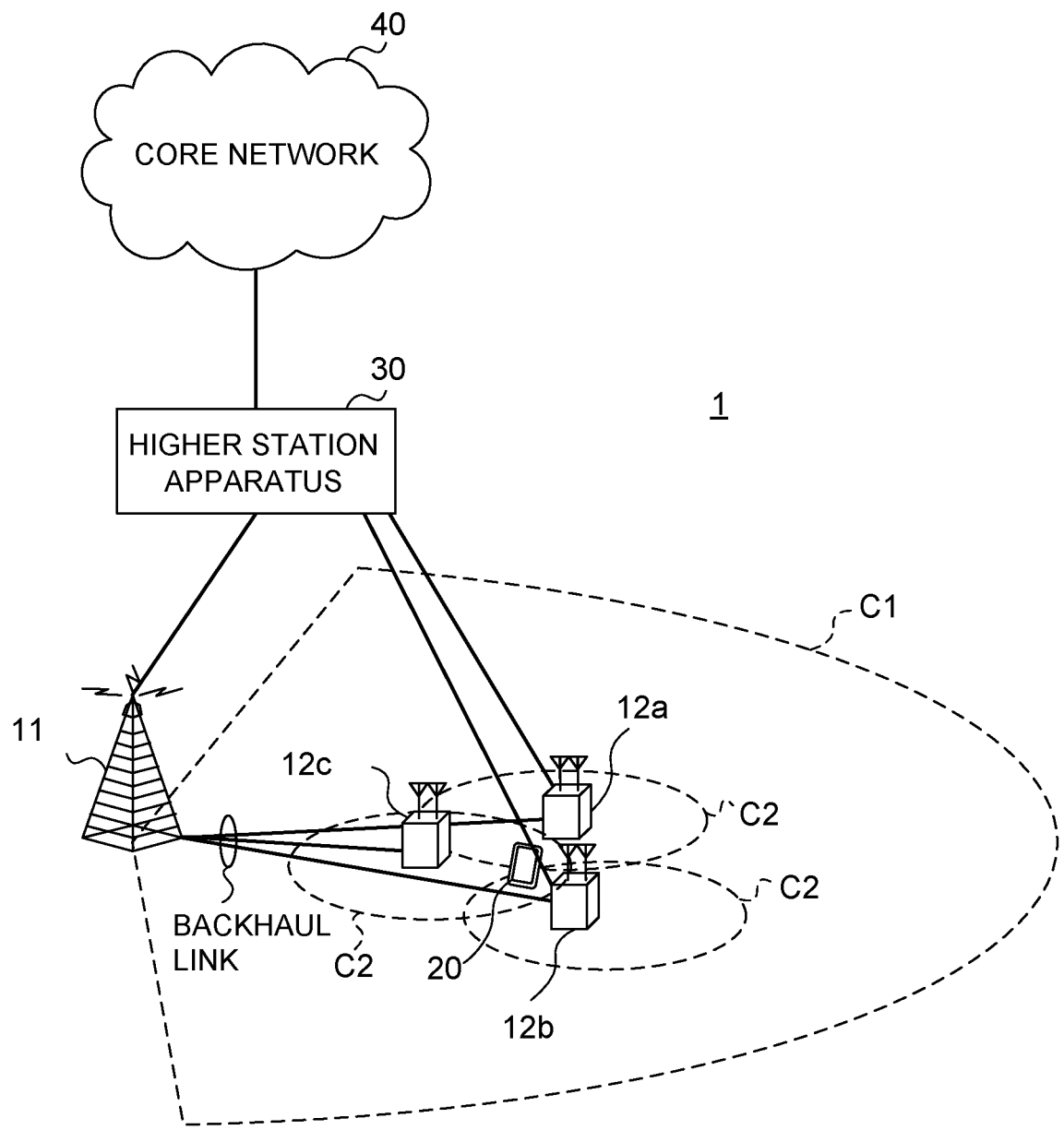
FIG. 14 is a diagram showing one example of a schematic configuration of a radio communication system according to this Embodiment.

FIG. 14 is a diagram showing one example of a schematic configuration of the radio communication system according to this Embodiment. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC). In addition, the radio communication system 1 may be called SUPER 3G, LTE-A (LTE-Advanced), IMT-Advanced, 4G, 5G, FRA (Future Radio Access), NR (New Rat: New Radio Access Technology) and the like.

The radio communication system 1 as shown in FIG. 14 is provided with a radio base station 11 for forming a macrocell C1, and radio base stations 12a to 12c disposed inside the macrocell C1 to form small cells C2 narrower than the macrocell C1. Further, a user terminal 20 is disposed in the macrocell C1 and each of the small cells C2. It may be configured to apply different numerology between cells and/or inside the cell.

The user terminal 20 is capable of connecting to both the radio base station 11 and the radio base station 12. The user terminal 20 is assumed to concurrently use the macrocell C1 and small cell C2 using different frequencies, by CA or DC. Further, the user terminal 20 may apply CA or DC using a plurality of cells (CCs) (e.g., 2 or more CCs). Furthermore, the user terminal is capable of using a licensed band CC and an unlicensed band CC as a plurality of CCs.

Moreover, the user terminal 20 is capable of performing communication in each cell, using Time Division Duplex (TDD) or Frequency Division Duplex (FDD). A cell of TDD and a cell of FDD may be called TDD carrier (Frame configuration type 2), FDD carrier (Frame configuration type 1), or the like, respectively.

Further, in each cell (carrier), a single numerology may be applied, or a plurality of different types of numerology may be applied.

The user terminal 20 and radio base station 11 are capable of communicating with each other using carriers (called the existing carrier, Legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, 30

GHz to 70 GHs, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface, etc.), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal, as well as the mobile communication terminal. Further, the user terminal 20 is capable of performing Device-to-Device (D2D) communication with another user terminal 20

In the radio communication system 1, as radio access schemes, OFDMA (Orthogonal Frequency Division Multiple Access) is applicable on downlink (DL), and SC-FDMA (Single Carrier-Frequency Division Multiple Access) is applicable on uplink (UL). OFDMA is a multi-carrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and OFDMA may be used on UL.

As DL channels, in the radio communication system 1 are used a DL shared channel (PDSCH: Physical Downlink Shared Channel, also referred to as DL data channel, etc.) shared by user terminals 20, broadcast channel (PBCH: Physical Broadcast Channel), L1/L2 control channels and the like. User data, higher layer control information, SIB (System Information Block) and the like are transmitted on the PDSCH. Further, MIB (Master Information Block) is transmitted on the PBCH.

The L1/L2 control channel includes DL control channels (PDCCH (Physical Downlink Control Channel), EPDCCH (Enhanced Physical Downlink Control channel)), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. The EPDCCH is frequency division multiplexed with the PDSCH to be used in transmitting the DCI and the like as the PDCCH. It is possible to transmit retransmission control information (ACK/NACK) of HARQ to the PUSCH, using at least one of the PHICH, PDCCH and EPDCCH.

As UL channels, in the radio communication system 1 are used a UL shared channel (PUSCH: Physical Uplink Shared Channel, also referred to as UL data channel, etc.) shared by user terminals 20, UL control channel (PUCCH: Physical Uplink Control Channel), random access channel (PRACH: Physical Random Access Channel) and the like. User data and higher layer control information is transmitted on the PUSCH. Uplink control information (UCI) including at least one of retransmission control information (A/N) of a DL signal, channel state information (CSI) and the like is transmitted on the PUSCH or PUCCH. It is possible to transmit a random access preamble to establish connection with the cell on the PRACH.

Radio Base Station

Figure 15:
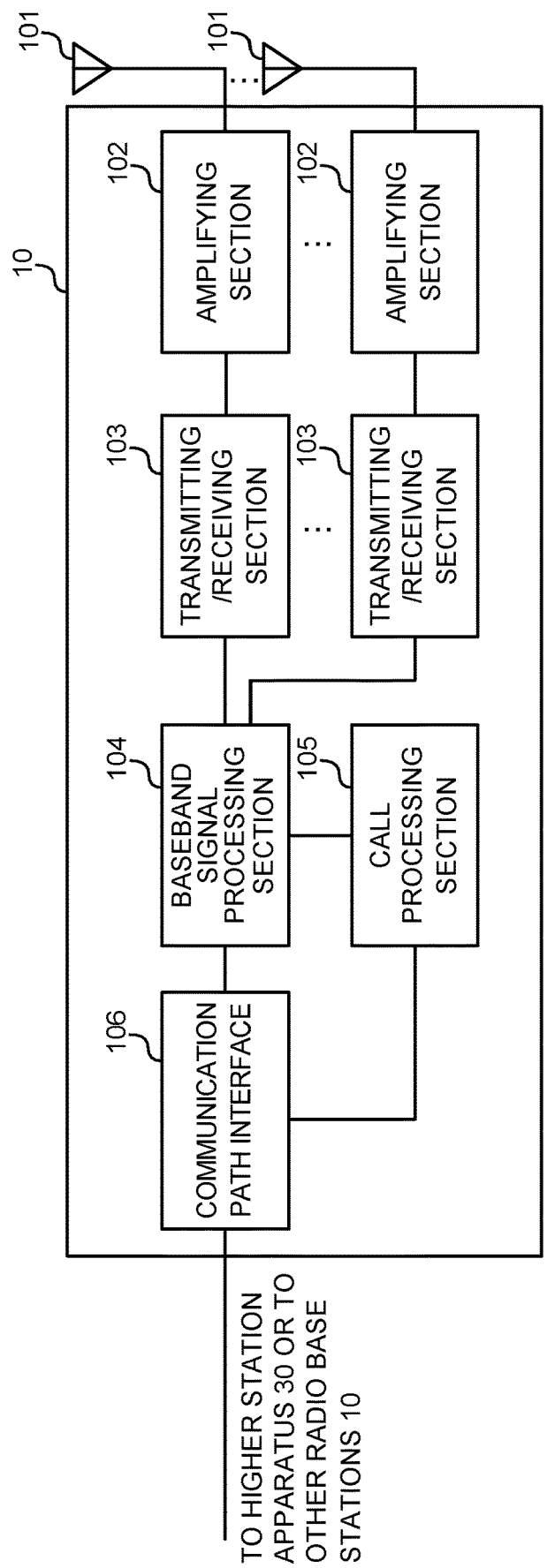
FIG. 15 is a diagram showing one example of an entire configuration of a radio base station according to this Embodiment.

FIG. 15 is a diagram showing one example of an entire configuration of the radio base station according to this Embodiment. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ (Hybrid Automatic Request reQuest)), scheduling, transmission format selection, channel coding, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101.

The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for UL signals, radio-frequency signals received in the transmitting/receiving antennas 101 are amplified in the amplifying sections 102. The transmitting/receiving section 103 receives the UL signal amplified in the amplifying section 102. The transmitting/receiving section 103 performs frequency conversion on the received signal into a baseband signal to output to the baseband signal processing section 104.

For UL data included in the input UL signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing such as configuration and release of a communication channel, state management of the radio base station 10, and management of radio resources.

The communication path interface 106 transmits and receives signals to/from the higher station apparatus 30 via a predetermined interface. Further, the communication path interface 106 may transmit and receive signals (backhaul signaling) to/from another adjacent radio base station 10 via an inter-base station interface (e.g., optical fiber in conformity with CPRI (Common Public Radio Interface), X2 interface).

Further, the transmitting/receiving section 103 transmits DL signals (including at least one of DL data signal, DL control signal and DL reference signal) to a plurality of user terminals 20 with different numerology, and receives UL signals (including at least one of UL data signal, UL control signal and UL reference signal) from the plurality of user terminals 20.

Furthermore, the transmitting/receiving section 103 receives UCI from the user terminal 20, using the UL data channel (e.g., PUCCH) or UL control channel (e.g., PUCCH). The UCI includes at least one of ACK/NACK of the DL data channel (e.g., PDSCH), CSI and SR.

Still furthermore, the transmitting/receiving section 103 transmits the instruction information for indicating a parameter (PUCCH parameter) on the UL control channel. The parameter is essentially a parameter determined by at least one of the PUCCH configuration (Aspect 1), PUCCH format/structure (Aspect 2), PUCCH structure (Aspect 2), PUCCH resource (Aspect 2), PUCCH waveform (Aspect 2), PUCCH timing (Aspect 2) and PUCCH numerology (Aspect 2).

Figure 16:
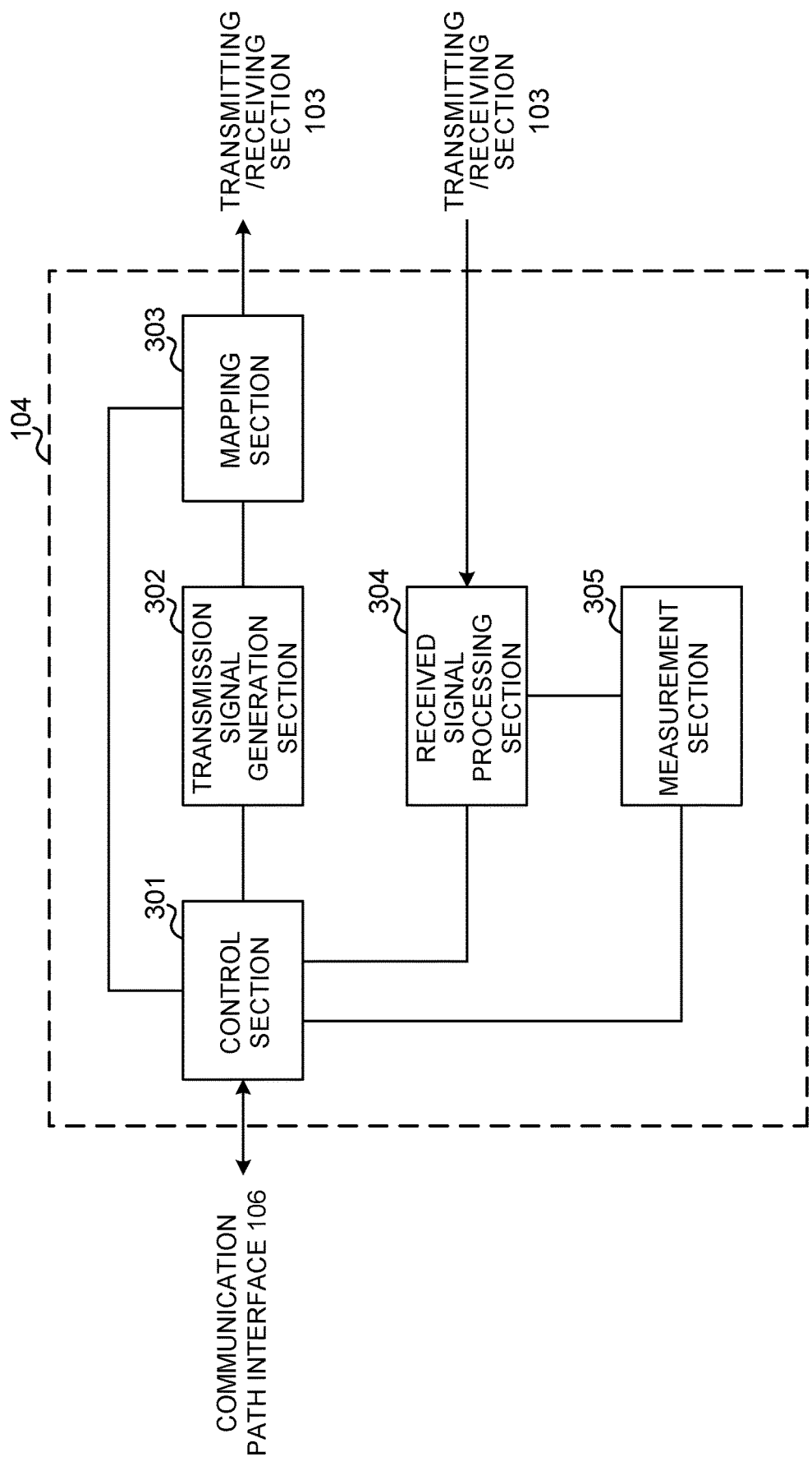
FIG. 16 is a diagram showing one example of a function configuration of the radio base station according to this Embodiment.

FIG. 16 is a diagram showing one example of a function configuration of the radio base station according to this Embodiment. In addition, FIG. 16 mainly illustrates function blocks of a characteristic portion in this Embodiment, and the radio base station 10 is assumed to have other function blocks required for radio communication. As shown in FIG. 16, the baseband signal processing section 104 is provided with a control section 301, transmission signal generating section 302, mapping section 303, received signal processing section 304, and measurement section 305.

The control section 301 performs control of the entire radio base station 10. For example, the control section 301 controls generation of DL signals by the transmission signal generating section 302, mapping of DL signals by the mapping section 303, reception processing (e.g., demodulation, etc.) of UL signals by the received signal processing section 304, and measurement by the measurement section 305.

Specifically, the control section 301 performs scheduling of the user terminal 20. Specifically, based on the UCI from the user terminal 20, the control section 301 may perform scheduling of the DL data channel and/or the UL data channel and/or retransmission control.

Further, the control section 301 may determine a parameter (PUCCH parameter) on the UL control channel, and control to transmit the instruction information for indicating the parameter. The parameter is essentially a parameter determined by at least one of the PUCCH configuration (Aspect 1), PUCCH format/structure (Aspect 2), PUCCH structure (Aspect 2), PUCCH resource (Aspect 2), PUCCH waveform (Aspect 2), PUCCH timing (Aspect 2) and PUCCH numerology (Aspect 2).

Based on each UL control channel configuration, the control section 301 may control the received signal processing section 304 so as to perform reception processing of the UCI from the user terminal 20.

The control section 301 is capable of being comprised of a controller, control circuit or control apparatus explained based on the common recognition in the technical field according to the present invention.

Based on instructions from the control section 301, the transmission signal generating section 302 generates DL signals (including the DL data signal, DL control signal and DL reference signal) to output to the mapping section 303.

The transmission signal generating section 302 is capable of being a signal generator, signal generating circuit or signal generating apparatus explained based on the common recognition in the technical field according to the present invention.

Based on instructions from the control section 301, the mapping section 303 maps the DL signal generated in the transmission signal generating section 302 to predetermined radio resources to output to the transmitting/receiving section 103. The mapping section 303 is capable of being a mapper, mapping circuit or mapping apparatus explained based on the common recognition in the technical field according to the present invention.

The received signal processing section 304 performs reception processing (e.g., demapping, demodulation, decoding, etc.) on the UL signal (e.g., including the UL data signal, UL control signal and UL reference signal) transmitted from the user terminal 20. Specifically, the received signal processing section 304 may output the received signal and signal subjected to the reception processing to the measurement section 305. Further, based on the UL control channel configuration indicated from the control section 301, the received signal processing section 304 performs the reception processing of the UCI.

The measurement section 305 performs measurement on the received signal. The measurement section 305 is capable of being comprised of a measurement device, measurement circuit or measurement apparatus explained based on the common recognition in the technical field according to the present invention.

For example, based on received power (e.g., RSRP (Reference Signal Received Power)) and/or received quality (e.g., RSRQ (Reference Signal Received Quality)) of the UL reference signal, the measurement section 305 may measure the channel quality of UL. The measurement result may be output to the control section 301.

User Terminal

Figure 17:
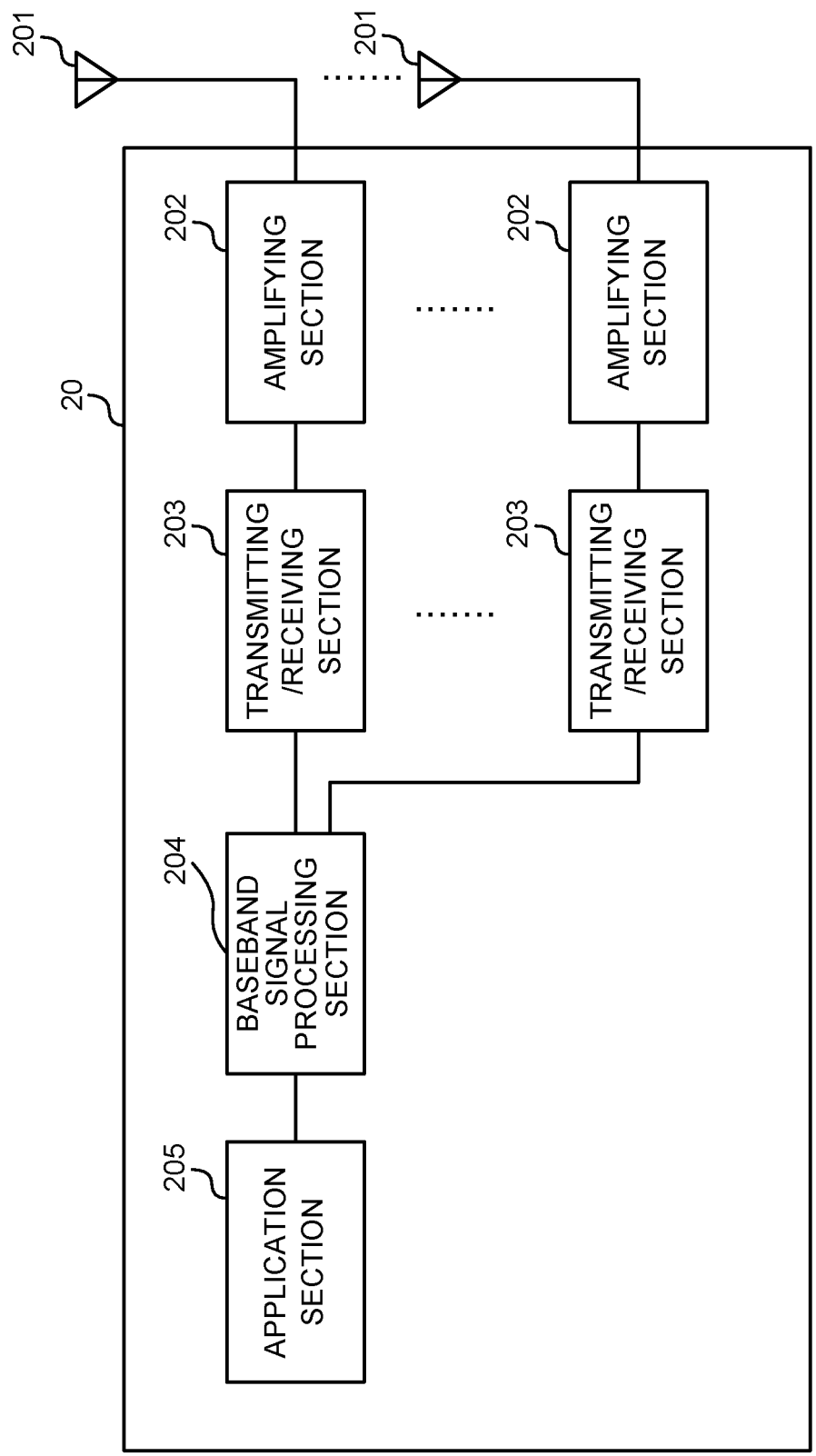
FIG. 17 is a diagram showing one example of an entire configuration of a user terminal according to this Embodiment.

FIG. 17 is a diagram showing one example of an entire configuration of the user terminal according to this Embodiment. The user terminal 20 is provided with a plurality of transmitting/receiving antennas 201 for MIMO transmission, amplifying sections 202, transmitting/receiving sections 203, baseband signal processing section 204, and application section 205.

Radio-frequency signals received in a plurality of transmitting/receiving antennas 201 are respectively amplified in the amplifying sections 202. Each of the transmitting/receiving sections 203 receives the DL signal amplified in the amplifying section 202. The transmitting/receiving section 203 performs frequency conversion on the received signal into a baseband signal to output to the baseband signal processing section 204.

The baseband signal processing section 204 performs FFT processing, error correcting decoding, reception processing of retransmission control and the like on the input baseband signal. DL data is transferred to the application section 205. The application section 205 performs processing concerning layers higher than the physical layer and MAC layer, and the like. Further, the broadcast information is also transferred to the application section 205.

On the other hand, for UL data, the data is input to the baseband signal processing section 204 from the application section 205. The baseband signal processing section 204 performs, on the data, transmission processing of retransmission control (e.g., transmission processing of HARQ), channel coding, rate matching, puncturing, Discrete Fourier Transform (DFT) processing, IFFT processing and the like to transfer to each of the transmitting/receiving sections 203. Also on the UCI, the section 204 performs at least one of channel coding, rete matching, puncturing, DFT processing and IFFT processing to transfer to each of the transmitting/receiving sections 203.

Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

Further, the transmitting/receiving section 203 receives the DL signal (including the DL data signal, DL control signal and DL reference signal) of numerology configured for the user terminal 20, and transmits the UL signal (including the UL data signal, UL control signal and UL reference signal) of the numerology.

Furthermore, the transmitting/receiving section 203 transmits the UCI to the radio base station 10, using the UL data channel (e.g., PUCCH) or UL control channel (e.g., PUCCH). Still furthermore, the transmitting/receiving section 203 receives the above-mentioned instruction information for indicating the PUCCH parameter.

The transmitting/receiving section 203 is capable of being a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

Figure 18:
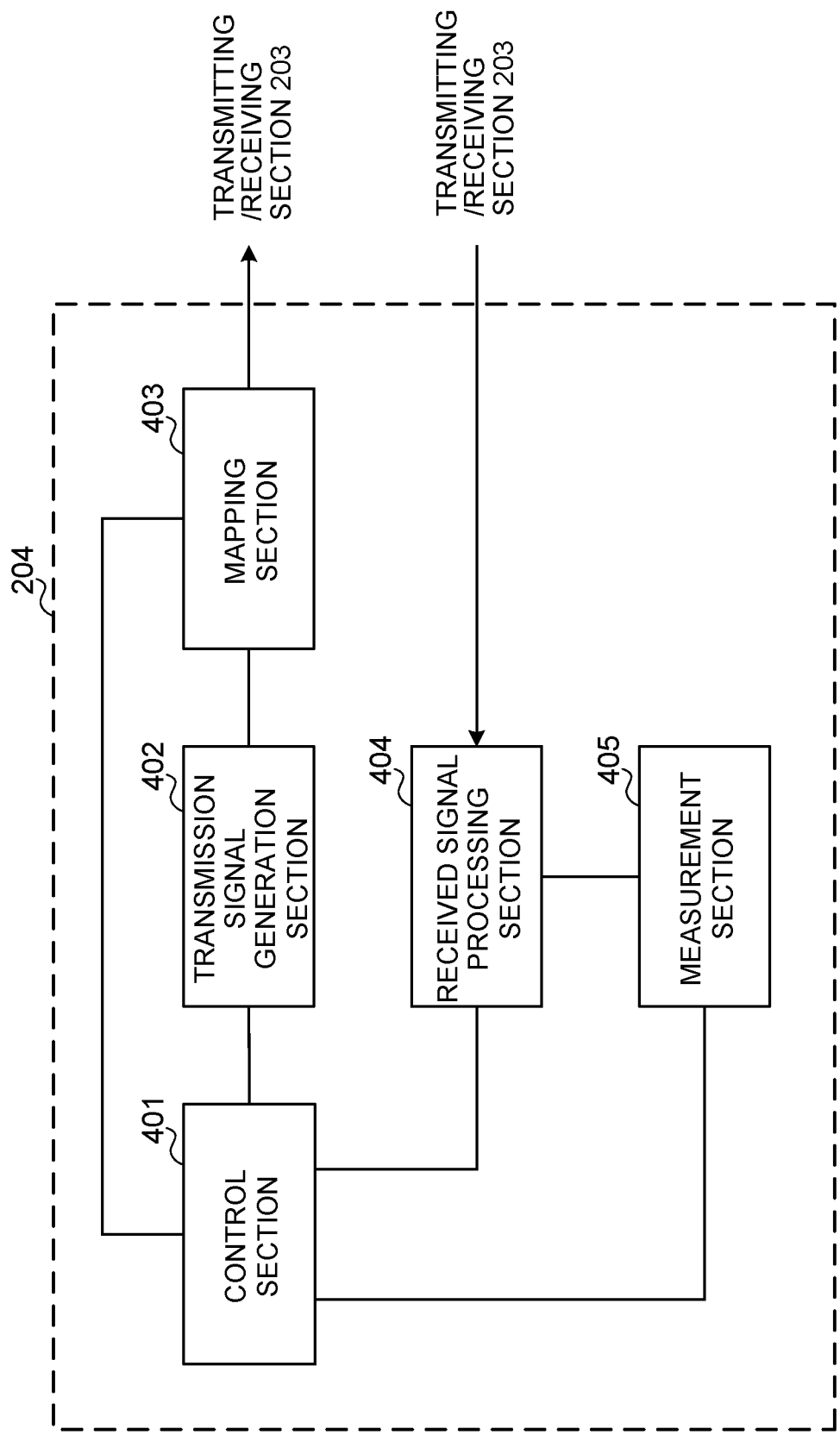
FIG. 18 is a diagram showing one example of a function configuration of the user terminal according to this Embodiment.

FIG. 18 is a diagram showing one example of a function configuration of the user terminal according to this Embodiment. In addition, FIG. 18 mainly illustrates function blocks of a characteristic portion in this Embodiment, and the user terminal 20 is assumed to have other function blocks required for radio communication. As shown in FIG. 18, the baseband signal processing section 204 that the user terminal 20 has is provided with a control section 401, transmission signal generating section 402, mapping section 403, received signal processing section 404, and measurement section 405.

The control section 401 performs control of the entire user terminal 20. For example, the control section 401 controls generation of UL signals by the transmission signal generating section 402, mapping of UL signals by the mapping section 403, reception processing of DL signals by the received signal processing section 404, and measurement by the measurement section 405.

Further, based on an explicit instruction from the radio base station 10 or an implicit determination in the user terminal 20, the control section 401 controls the UL control channel used in transmission of the UCI from the user terminal (Aspect 2).

Specifically, based on at least one of the information indicative of the time length of UL duration, instruction information from the radio base station 10, payload of the UCI, and the number of transmission times of downlink (DL) data in the case where the UCI includes retransmission control information to the DL data, the control section 401 may determine the PUCCH format/structure (or, at least one PUCCH parameter included in the PUCCH format/structure).

Further, based on control information from the radio base statin 10 and/or an implicit determination in the user terminal 20, the control section 401 may determine the PUCCH resource.

Furthermore, based on at least one of the information indicative of the time length of the PUCCH, the number of symbols of the PUCCH, the instruction information from the radio base station 10, and the waveform of the PUSCH, the control section 401 may determine the PUCCH waveform.

Still furthermore, based on at least one of the instruction information from the radio base station 10, descriptions of the UCI, and numerology of the PUCCH, the control section 401 may determine PUCCH timing (or, at least one parameter included in the PUCCH timing).

Moreover, based on the instruction information from the radio base station 10, the control section 401 may determine PUCCH numerology.

Further, the control section 401 controls transmission of the UCI in a slot assigned the PUSCH (Aspect 3). Specifically, based on the PUSCH waveform and/or whether PUCCH transmission and PUSCH transmission temporally overlaps, the control section 401 may determine to use the PUSCH or the PUCCH to transmit the UCI.

Furthermore, the control section 401 may control transmission of the UCI in a slot assigned SRS (Aspect 4).

The control section 401 is capable of being comprised of a controller, control circuit or control apparatus explained based on the common recognition in the technical field according to the present invention.

Based on instructions from the control section 401, the transmission signal generating section 402 generates (e.g., performs coding, rate matching, puncturing, modulation, etc. on) UL signals (including the UL data signal, UL control signal, UL reference signal and UCI) to output to the mapping section 403. The transmission signal generating section 402 is capable of being a signal generator, signal generating circuit or signal generating apparatus explained based on the common recognition in the technical field according to the present invention.

Based on instructions from the control section 401, the mapping section 403 maps the UL signal generated in the transmission signal generating section 402 to radio resources to output to the transmitting/receiving section 203. The mapping section 403 is capable of being a mapper, mapping circuit or mapping apparatus explained based on the common recognition in the technical field according to the present invention.

The received signal processing section 404 performs reception processing (e.g., demapping, demodulation, decoding, etc.) on the DL signal (DL data signal, scheduling information, DL control signal, DL reference signal). The received signal processing section 404 outputs the information received from the radio base station 10 to the control section 401. For example, the received signal processing section 404 outputs, to the control section 401, the broadcast information, system information, higher layer control information by higher layer signaling such as RRC signaling, physical layer control information (L1/L2 control information), and the like.

The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

Based on a reference signal (e.g., CSI-RS) from the radio base station 10, the measurement section 405 measures a channel state, and outputs the measurement result to the control section 401. In addition, measurement of the channel state may be performed for each CC.

The measurement section 405 is capable of being comprised of a signal processing device, signal processing circuit or signal processing apparatus and a measurement device, measurement circuit or measurement apparatus explained based on the common recognition in the technical field according to the present invention.

Hardware Configuration

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g., by cable and/or radio), and each function block may be actualized by a plurality of these apparatuses.

Figure 19:
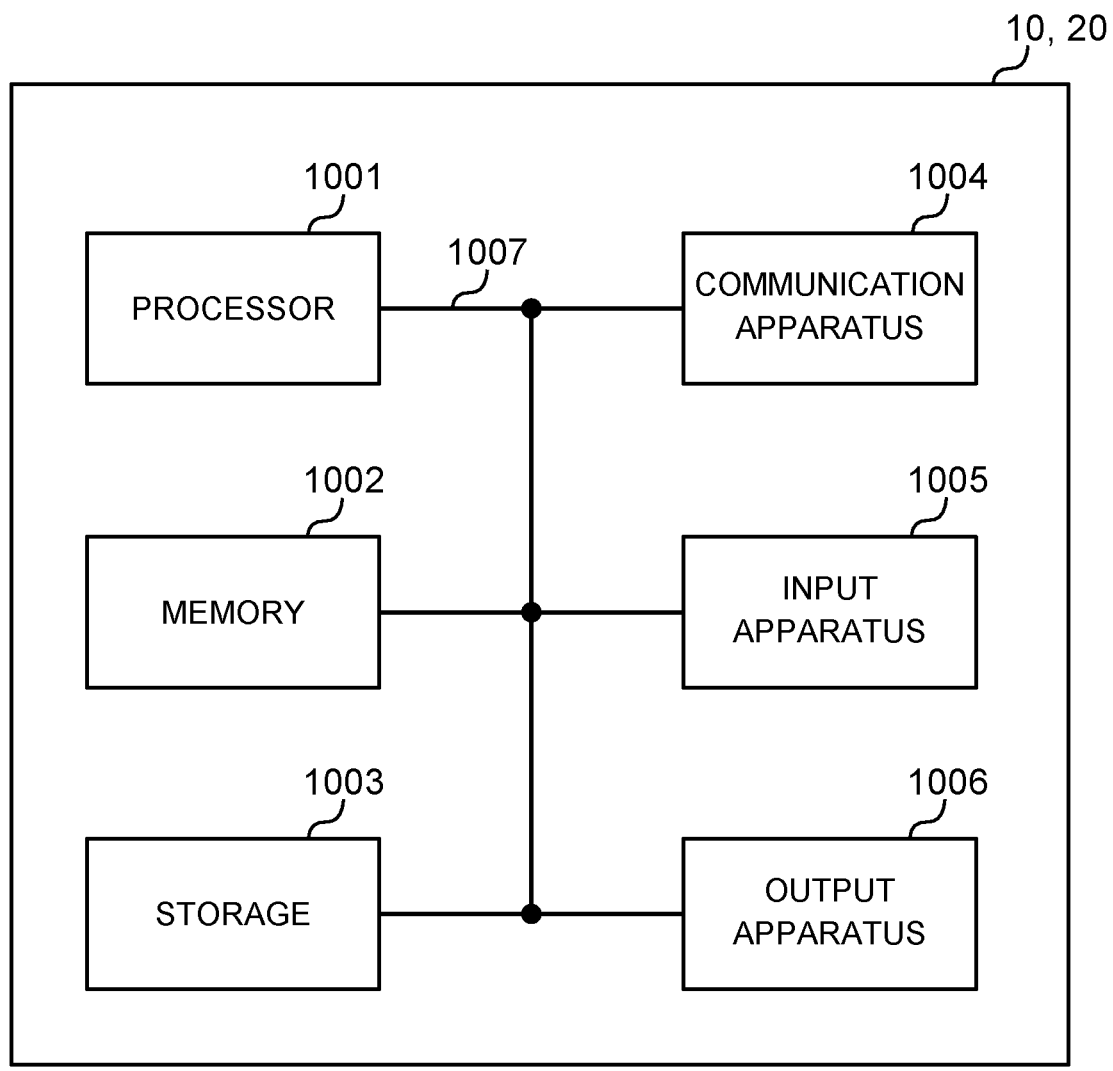
FIG. 19 is a diagram showing one example of hardware configurations of the radio base station and user terminal according to this Embodiment.

For example, each of the radio base station, user terminal and the like in one Embodiment of the present invention may function as a computer that performs the processing of the radio communication method of the present invention. FIG. 19 is a diagram showing one example of a hardware configuration of each of the radio base station and user terminal according to one Embodiment of the present invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or a part or the whole of each function block may be actualized by the hardware. For example, the processor 1001 may be implemented by at least one of the hardware.

Modification

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain. The one or each of the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may a time unit based on numerology. Moreover, the slot may include a plurality of mini-slots. Each mini-slot may be comprised of one or a plurality of symbols in the time domain. Further, the mini-slot may be called a subslot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel.8-12), normal TTI, long TTI, ordinary subframe, normal subframe, long subframe or the like. The TTI shorter than the ordinary TTI may be called shortened TTI, short TTI, partial or fractional TTI, shortened subframe, short subframe, mini-slot, subslot or the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini-slot, 1 subcarrier, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), resource element group (REG), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present Description may be expressed by an absolute value, may be expressed by a relative value from a predetermined value, or may be expressed by another corresponding information. For example, the radio resource may be indicated by a predetermined index. Further, equations using these parameters and the like may be different from those explicitly disclosed in the present Description.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed with a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiment described in the present Description, and may be performed by another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified by MAC Control Element (MAC CE).

Further, notification of predetermined information (e.g., notification of "being X") is not limited to notification that is performed explicitly, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and " component carrier" are capable of being used interchangeably. There is the case where the base station is called by the terms of fixed station, NodeB, eNodeB (eNB), access point, transmission point, reception point, femto-cell, small cell and the like.

The base station is capable of accommodating one or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by an upper node thereof in some case. In a network comprised of one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall. These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, " determining" may be regarded as "determining" calculating, computing, processing, deriving, investigating, looking up (e.g., looking up in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access". In the case of using in the present Description, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the case of using "including", "comprising" and modifications thereof in the present Description or the scope of the claims, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The disclosure of Japanese Patent Application No. 2016-214704, filed on Nov. 1, 2016, including the specification, drawings, and abstract, is incorporated herein by reference in its entirety.

The invention claimed is:

1. A terminal comprising:
   a receiver that receives downlink control information and a downlink (DL) shared channel scheduled by the downlink control information; and
   a processor that controls a transmission of a Hybrid Automatic Repeat request-Acknowledgement (HARQ-ACK) in response to the DL shared channel, the HARQ-ACK using an uplink (UL) control channel in a slot that is determined by the downlink control information,
   wherein reception of the downlink control information and transmission of the HARQ-ACK are allowed within one slot,
   subcarrier spacing of the UL control channel is configured by a first higher layer signaling,
   unless a particular instruction is given, a downlink (DL) control channel, a DL shared channel and a UL shared channel are each configured with a subcarrier spacing that is the same as the subcarrier spacing of the UL control channel, and
   the processor determines an orthogonal cover code of the UL control channel based on the downlink control information and a second higher layer signaling.

2. A radio communication method for a terminal comprising:
   receiving downlink control information and a downlink (DL) shared channel scheduled by the downlink control information; and
   controlling a transmission of a Hybrid Automatic Repeat request-Acknowledgement (HARQ-ACK) in response to the DL shared channel, the HARQ-ACK using an uplink (UL) control channel in a slot that is determined by the downlink control information,
   wherein reception of the downlink control information and transmission of the HARQ-ACK are allowed within one slot,
   subcarrier spacing of the UL control channel is configured by a first higher layer signaling,
   unless a particular instruction is given, a downlink (DL) control channel, a DL shared channel and a UL shared channel are each configured with a subcarrier spacing that is the same as the subcarrier spacing of the UL control channel, and
   the terminal determines an orthogonal cover code of the UL control channel based on the downlink control information and a second higher layer signaling.

3. A terminal comprising:
   a receiver that receives downlink control information and a downlink (DL) shared channel scheduled by the downlink control information, and receives information indicating a periodicity by a first higher layer signaling; and a processor that controls a transmission of a Hybrid Automatic Repeat request-Acknowledgement (HARQ-ACK) in response to the DL shared channel, and controls a transmission of a channel state information that uses an uplink (UL) control channel in a slot that is determined based on the periodicity, wherein reception of the downlink control information and transmission of the HARQ-ACK are allowed within one slot, subcarrier spacing of the UL control channel is configured by a second higher layer signaling, unless a particular instruction is given, a downlink (DL) control channel, a DL shared channel and a UL shared channel are each configured with a subcarrier spacing that is the same as the subcarrier spacing of the UL control channel, and the processor determines an orthogonal cover code of the UL control channel based on downlink control information and a third higher layer signaling.

4. A system comprising:

a base station comprising:

a transmitter that transmits downlink control information and a downlink (DL) shared channel scheduled by the downlink control information; and a terminal comprising:

a receiver that receives the downlink control information and the DL shared channel scheduled by the downlink control information; and a processor that controls a transmission of a Hybrid Automatic Repeat request-Acknowledgement (HARQ-ACK) in response to the DL shared channel, the HARQ-ACK using an uplink (UL) control channel in a slot that is determined by the downlink control information, wherein reception of the downlink control information and transmission of the HARQ-ACK are allowed within one slot, subcarrier spacing of the UL control channel is configured by a first higher layer signaling, unless a particular instruction is given, a downlink (DL) control channel, a DL shared channel and a UL shared channel are each configured with a subcarrier spacing that is the same as the subcarrier spacing of the UL control channel, and the processor determines an orthogonal cover code of the UL control channel based on the downlink control information and a second higher layer signaling.

* * * * *